US007022981B2

(12) United States Patent
Kato

(10) Patent No.: US 7,022,981 B2
(45) Date of Patent: Apr. 4, 2006

(54) MASS ANALYSIS APPARATUS AND METHOD FOR MASS ANALYSIS

(75) Inventor: Yoshiaki Kato, Mito (JP)

(73) Assignee: Hitachi High-Technologies Corporation, Tokyo (JP)

( * ) Notice: Subject to any disclaimer, the term of this patent is extended or adjusted under 35 U.S.C. 154(b) by 10 days.

(21) Appl. No.: 10/690,750

(22) Filed: Oct. 23, 2003

(65) Prior Publication Data

US 2004/0089802 A1 May 13, 2004

(30) Foreign Application Priority Data

Oct. 25, 2002 (JP) .............................. 2002-310415

(51) Int. Cl.
*B01D 59/44* (2006.01)
*H01J 49/00* (2006.01)

(52) U.S. Cl. ....................................... 250/288; 250/281

(58) Field of Classification Search ................ 250/281, 250/288

See application file for complete search history.

(56) References Cited

U.S. PATENT DOCUMENTS 6,583,409 B1 * 6/2003 Kato .......................... 250/288
6,649,907 B1 * 11/2003 Ebeling et al. ............. 250/288
2001/0035494 A1 11/2001 Scalf et al.

FOREIGN PATENT DOCUMENTS

JP 8-54370 2/1996
JP 8-145950 6/1996
JP 2002-63865 2/2002

OTHER PUBLICATIONS

Stephenson, et al., "Ion/Ion Proton Transfer Reactions for Protein Mixture Analysis" Analytical Chemistry, vol. 68, No. 22, pp. 4026-4032, Nov. 15, 1996.

Stephenson et al., "Adaptation of the Paul Trap for Study of the Reaction of Multiply Charged Cations with Singly Charged Anions" International Journal of Mass Spectrometry and Ion Processes, vol. 162, pp. 89-106, (1997).

Ebeling, et al., "Corona Discharge in Charge Reduction Electrospray Mass Spectrometry" Analytical Chemistry, vol. 72, No. 21, pp. 5158-5161, Nov. 1, 2000.

Scalf, et al., "Controlling Charge States of Large Ions" Science, vol. 283, pp. 194-197, Jan. 8, 1999.

* cited by examiner

*Primary Examiner*—Nikita Wells
*Assistant Examiner*—David A. Vanore
(74) *Attorney, Agent, or Firm*—Dickstein Shapiro Morin & Oshinsky LLP

(57) ABSTRACT

A mass analysis apparatus comprising a first ion source which ionizes a sample and produces sample ions, a second ion source which produces reactant ions having a polarity opposite to the polarity of the sample ions, and a mass spectrometer, wherein said second ion source is provided between said first ion source and said mass spectrometer apart from the axis of a flow of the sample ions discharged from said first ion source and emits reactant ions to the flow of sample ions discharged from said first ion source.

12 Claims, 21 Drawing Sheets

MASS SPECTRUM $id_n = k(\Sigma I)_{n-1} + id_0$

MASS ANALYSIS APPARATUS AND METHOD FOR MASS ANALYSIS

BACKGROUND OF THE INVENTION

FIELD OF THE INVENTION

This invention relates to a mass analysis apparatus, particularly to a mass analysis apparatus that simplifies mass spectra complicated by multiply-charged ions for easy analysis.

A mass spectrometer (MS) is an apparatus designed to measure masses of substances directly, at high sensitivities, and at high accuracy. Thanks to these features, the mass spectrometers are used in various fields from space physics field to biotechnology field.

There are many kinds of mass spectrometers (MSs) having different principles of measurement. Among these, a quadrupole mass spectrometer (QMS) and an ion trap mass spectrometer (ITMS) have been widespread in various fields as they have various functions although they are small. These mass spectrometers QMS and ITMS were invented by Dr. Paul in the 1950s and their basic concepts were disclosed by U.S. Pat. No. 2,939,952. Recently, a time-of-flight (TOF) mass spectrometer and an ion cyclotron resonance mass spectrometer (ICRMS) have been widely used for mass spectroscopy of biomolecules such as protein.

In recent years, various soft ionization technologies such as matrix-assisted laser desorption ionization (MALDI) and electro-spray ionization (ESI) have been developed, which enables mass spectrometry of biomolecules such as proteins and DNAs. Particularly, the ESI is a soft ionization technology that can take out gaseous stable ions of biomolecules that are apt to be decomposed by heat directly from its liquid status.

In the ESI, biomolecules such as proteins, peptides obtained by digestion of proteins, and DNAs generally yield multiply-charged ions having multiple charges. A multiply-charged ion has a plurality of charges (n-charged) on a single molecule. The mass spectrometer (MS) uses mass-to-charge ratios (m/z) of molecules for mass analysis. A "n"-charged ion of mass "m" is mass-analyzed as an ion of a mass-to-charge ratio "m/n." For example, let's assume that a protein of mass 30,000 yields a 30-charged ion, the mass-to-charge ratio (m/z) of this multiply-charged ion is 1,000 (=30,000/30). In mass analysis, this multiply-charged ion is equivalent to a single-charged ion of mass 1,000.

Usually, most of proteins and peptides yield positive multiply-charged ions and DNAs yield negative multiply-charged ions. Therefore, even small mass spectrometers such as quadrupole mass spectrometer (QMS) and ion trap mass spectrometer (ITMS) can measure proteins and DNAs whose molecular weight is over 10,000.

For analysis of trace amounts of ingredients in bloods or biomolecules, a lot of interfering components (impurities) in them must be removed by a pretreatment or cleanup before the mass analysis. The pretreatment and cleanup require a log of time and manpower. However, it is impossible to remove all impurities completely by complicated pretreatments. The spectra of the impurities overlap the spectra of the biomolecule components. This interference is called a chemical noise. To remove or separate such impurities, a liquid chromatograph/mass spectrometer (LC/MS) has been developed which has a liquid chromatograph (LC) before a mass spectrometer (MS).

However, high-sensitivity analysis of extremely small amounts of ingredients in bloods and biomolecules cannot be attained easily even with the help of pretreatment, cleanup, and/or liquid chromatograph (LC). This is because, in most cases, impurities are overwhelmingly greater than target ingredients whose quantities are extremely small (several picogram (pg)=$10^{-12}$ gram) and signal noises due to the impurities cannot be removed fully even by a pretreatment and liquid chromatograph (LC).

One of solutions for distinguishing signal peaks due to target ingredients from noise signals due to impurities is disclosed by a non-patent document 1 (by Dr. McLuckey et al.) It is an effort to distinguish target ingredients from interfering ingredients (chemical noises) and impurities by a mass spectrometer. For LC/MS analysis of biological samples, most of the interfering ingredients are solvent, salts, lipid, and carbohydrates whose molecular weights are comparatively low (up to 1,000). The spectra of their ions overlap the spectra of biomolecular ions on the mass spectrum chart of the biomolecules such as proteins, peptides, and DNAs whose molecular weights are 2,000 or more. This is because most of the biomolecules yield multiply-charged ions and their mass peaks apparently appear in the low mass region of the mass spectrum.

In the electrospray ionization (ESI) which is used as an ion source for LC/MS, most of interfering materials of comparatively low molecular weight are single-charged ions. Contrarily, most of biomolecules such as proteins and peptides yield multiply-charged ions. Dr. McLuckey et al. used the difference in the charge number between single-charged chemical noise ions and multiply-charged ions to distinguish them from each other. In other words, they took steps of feeding positive ions generated by the ESI into an ion trap mass spectrometer disposed in vacuum, trapping ions in the ion trap volume, and feeding negative ions generated by glow-discharging into the ion trap volume so that both positive and negative ions might be trapped in the ion trap volume. As the result of ion-ion reactions in the ion trap volume, multiply-charged ions reduced their charges.

When single-charged negative ions and multiply-charged positive ions are trapped together in the ion trap to which a high frequency voltage is applied, ions attract each other by the Coulomb attraction and cause an ion-ion reaction. Various kinds of ion-ion reactions have been reported, but the proton ($H^+$) transfer reaction plays a most important role. In this ion-ion reaction, when the proton affinity (PA) of the negative ion exceeds that of the multiply-charged ions, the negative ion ($A^-$) deprives a n-valent ion $(m+nH)^{n+}$ of a proton ($H^+$). As the result, the multiply-charged ion loses one charge number and becomes $\{m+(n-1)H\}^{(n-1)+}$ as expressed by Formula (1).

$$(m+nH)^{n+}+A^- \rightarrow \{m+(n-1)H\}^{(n-1)+}+AH \qquad (1)$$

A multiply-charged ion having a greater Coulomb attraction is apt to cause the ion-ion reaction and transfer a proton ($H^+$) to a negative ion ($A^-$). As the result, the multiply-charged ion reduces its charge and its Coulomb attraction becomes less. This suppresses the ion-ion reaction a little. In other words, the single-charged ion is hard to reduce its charge and the multiply-charged ions will easily reduce charges.

Let's assume that a positive n-charged ion reduces its charge by the ion-ion reaction with a negative single-charged ion and yields a positive (n−1)-charged ion. As the mass of a proton ($H^+$) is 1 (H=1) as shown in Formula (1), the m/z value of the multiply-charged ion changes as expressed by Formula (2). The left side of the Formula indicates the m/z value of the multiply-charged ion before the ion-ion reaction and the right side indicates the m/z value of the multiply-charged ion after the ion-ion reaction.

$$(m+n)/n \rightarrow (m+n-1)/(n-1) \quad (2)$$

As the m/z value m/n+1 is transformed as shown by Formula (3), Formula (2) can also be expressed by Formula (4).

$$m/n+1 \rightarrow m/(n-1)+1 \quad (3)$$

$$m/n \rightarrow m/(n-1) \quad (4)$$

The difference (Δ) between the m/z value of the multiply-charged ion before the ion-ion reaction and the m/z value of the multiply-charged ion after the ion-ion reaction is expressed by the following:

$$\Delta = m/n - m/(n-1) = -m/\{n(n-1)\} \quad (5)$$

As "m," "n," and "n−1" are all positive integers, Formula (6) is obtained.

$$\Delta < 0$$

or $$m/n < m/(n-1) \quad (6)$$

As for a multiply-charged ion that reduces its charge by an ion-ion reaction, the m/z value of the multiply-charged ion after the ion-ion reaction becomes greater than the m/z value of the multiply-charged ion before the ion-ion reaction.

On the contrary, a single-charged ion hardly causes the ion-ion reaction and its m/z value on the mass spectrum chart remains unchanged. Further, when losing its charge by an ion-ion reaction, the single-charged ion becomes electrically neutral and evacuated by a vacuum pump as electrically neutral molecules are not mass-analyzed. Consequently, multiply-charged ions that reduce charges move toward a high mass region away from the impurity ion (chemical noise) region. away from the impurity ion (chemical noise) region. This makes it easier to distinguish multiply-charged ions from impurity ions.

Recently, Dr. McLuckey et al. improved this technique and proposed a technique of using a charge reduction by this ion-ion reaction to simplify the mass spectra of multiply-charged product ions that are generated after MS/MS. (Non-patent document 2)

The other technique using the charge reduction by the ion-ion reaction has been also proposed as disclosed by patent document 1 and non-patent document 3 (by Mr. Smith, et. al). This technique comprises connecting an ESI ion source and an atmospheric pressure chemical ion source (APCI) in series, supplying multiply-charged ions generated by the ESI ion source into the atmospheric pressure chemical ion source (APCI) at the atmospheric pressure, and causing ions having a polarity opposite to that of ions generated by the APCI ion source to make a charge reduction reaction by the ion-ion reaction. Two APCI methods have been disclosed: APCI using alpha rays emitted from radioactive isotopes as the ion source and APCI using corona discharging.

The technique by Mr. Smith, et. al causes the charge reduction reaction only while ions generated by the ESI ion source pass through the APCI ion source. In other words, the reaction is a temporary reaction. This technique cannot store ions generated by the ESI ion source in the APCI ion source and accelerate the ion-ion reaction. Ions which reduced charges are fed to an evacuated mass spectrometer for mass analysis. This technique is different from the technique developed by Dr. McLuckey et al. that comprises the steps of feeding multiply-charged ions and ions of the opposite polarity independently into a vacuum chamber, confining the ions in an ion trap, and causing ion-ion reactions there gradually.

There is still another technique is disclosed by patent document 2 which performs a charge reduction reaction of multiply-charged ions. This technique mixes multiply-charged ions generated by the ESI nebulizer probe with ions of the opposite polarity that are generated by ionizing a gas (to be ionized) in the APCI ion source, reacts them with each other, and causes reduction of charges.

Patent document 3 and patent document 4 disclose a technique comprising the steps of connecting an ESI and an APCI in series, spraying a sample by the ESI, and ionizing thereof by the APCI to distinguish a target component from salts and low-molecular-weight impurities fed from the LC. This technique assumes that salt-related ions are not mass-analyzed because the movement of salt-related ions generated by the ESI is curved to pass by the mass spectrometer by the force of a high electric field made by a high voltage applied to the corona discharging electrodes of the APCI.

Prior publications related to the present invention are listed below.

(1) US2001/0035494A1
(2) Japanese Patent Laid-open Publication No. 2002-63865
(3) Japanese Patent Laid-open Publication No. 08(1996)-54370
(4) Japanese Patent Laid-open Publication No. 08(1996)-145950
(5) Analytical Chemistry Vol. 68 (1996), 4026–4032
(6) International Journal of Mass Spectrometry and Ion processes Vol. 162 (1997), 89–106
(7) Analytical Chemistry Vol. 72 (2000), 899–907
(8)Science, Vol. 283 (1999) 194–197, Analytical Chemistry Vol. 72 (2000), 5158–5161

SUMMARY OF THE INVENTION

As the ion-ion reaction advances longer, the charge of the multiply-charged ions goes less and their peaks move towards the high mass region. Finally, the peaks go over the mass range of the mass spectrometer and the measurement is disabled. To continue measurement, it is necessary to control the reaction according to the quantities of positive and negative ions. It is possible to control the progress of the reaction of positive multiply-charged ions and negative reactant ions (that is the ion-ion reaction) according to the quantity of the negative reactant ions. As the quantity of the negative reactant ions increases, the charge reduction of positive multiply-charged ions advances to single-charged ions and finally to electrically neutral molecules.

In experiments by Dr. McLuckey et al., negative ions are fed though an aperture on the ring electrode of the ion trap mass spectrometer. However, in this case, as a high frequency voltage is applied to the ring electrode, the quantity of negative reactant ions passing through the aperture on the ring electrode is much smaller than the quantity of positive ions passing through another aperture on the center axis in the end cap side. The insufficient quantity of negative reactant ions prolongs the supply period of the negative ions and then the ion-ion reaction and may finally cause subsidiary reactions and loss of multiply-charged ions in the ion trap.

Further, the aperture on the ring electrode to supply negative ions skews the high frequency quadrupole electric field in the ion trap volume and deteriorates the important performance of the ion trap mass spectrometer such as resolution and sensitivity. To assure the performance of the ion trap mass spectrometer, the ion trap volume must be filled with a helium gas (as a buffer gas) of 1 mTorr ($10^{-3}$ Torr). However, it is difficult to keep this pressure (1 mTorr) while the space around the ion trap electrode is kept at a high vacuum degree (less than $10^{5}$ Torr) because the ring electrode has apertures. This deteriorates the performance of the ion trap mass spectrometer. Furthermore, it takes a lot of labor and time to switch polarities or kinds of reactant ions when polarities of the sample are switched in the ionization mode. Still furthermore, the method by Dr. McLuckey et al., has various problems such as system complexity and requirement of ingenious control of the ion trap mass spectrometer Among techniques (methods) disclosed by Smith et al., the APCI method using radioactive isotopes (US2001/0035494A1 and Science Vol.283 (1999) 194–197) is hard to be used widely because it requires radioactive isotopes. Further, this method must mechanically change metallic shielding plates having openings of different sizes to control the progress of the charge reduction reaction. This mechanical change of metallic shielding plates is not so fast and not recommendable because of manual shield changes in the presence of radioactive rays.

In the APCI method using corona discharging (Analytical Chemistry Vol.72 (2000) 5158–5161) instead of radioactive isotopes, positive multiply-charged ions generated at the tip of the ESI nebulizer probe are supplied to the APCI ion source through the ESI space. When the ESI ion source generates positive multiply-charged ions, the APCI ion source, a negative high voltage (having a polarity opposite to the polarity of the multiply-charged ions) is applied to the corona discharge electrode of the APCI ion source. The corona discharge electrode is provided in the mesh electrode on the axis of a flow of the multiply-charged ions generated by the ESI ion source. Positive multiply-charged ions that reached the corona discharge electrode in the mesh electrode have a greater Coulomb attraction than positive single-charged chemical noise ions have. As the result, the positive multiply-charged ions are attracted to the corona discharge electrode to which a negative high voltage is applied. Therefore, the multiply-charged ions that entered the mesh electrode are kept confined in the mesh electrode by its electric field. Finally, the multiply-charged ions attach to the corona discharge electrode and reduce their charges. The other ions that do not attach to the corona discharge electrode are curved to pass by the mass spectrometer. Contrarily, positive multiply-charged ions that move far away from the corona discharge electrode are neither attracted nor attached to the corona discharge electrode, but they exist less here than in the center of the ion flow. As only negative ions that come from the mesh electrode can cause the ion-ion reaction, the efficiency of the ion-ion reaction or the charge reduction reaction falls. Accordingly, the method by Smith et al. is not fit for high-sensitivity measurement of extremely small amounts of components.

Further, Smith et al. discloses a method of controlling a high voltage applied to the corona discharge electrode to control the progress of the charge reduction reaction. In other words, this method increases the high voltage applied to the corona electrode to intensify corona discharging when a lot of negative reactant ions are required. However, as the voltage applied to the corona discharge electrode increases, most of multiply-charged ions are attracted and captured by the high electric field generated at the tip of the corona discharge electrode and reduce their charges. Therefore, the sensitivity reduces as you try to progress the charge reduction reaction.

The APCI ion source that generates reactant ions in accordance with Japanese Application Patent Laid-open Publication No. 2002-63865 is not located between the mass spectrometer and the ESI ion source. Therefore, the ESI ion flow is not affected by the high voltage applied to the corona discharge electrode. However, as the APCI ion source is covered with the casing, most of the reactant ions generates by the APCI ion source diffuse in the casing, collide with the inner wall of the casing and cease to exist. This limits the quantity of reactant ions available. If the quantity of the reactant ions sent out of the casing of the APCI ion source is low, the charge reduction is not effective. However, Japanese Application Patent Laid-open Publication No. 2002-63865 has no detailed description on the flow speed of ions discharged from the ESI spray nozzle and the flow speed of reactant ions sent out from the APCI ion source. The flow speed of ions sprayed from the ESI ion source is very fast (generally a subsonic speed of approx. 300 m/sec) and the flow of ions sprayed from the ESI ion source may pass through the reaction space instantaneously without causing an ion-ion reaction. Consequently, this method limits a space for the ion-ion reaction and is hard to control the progress of the ion-ion reaction.

Japanese Application Patent Laid-open Publication No. 08-54370 and 08-145950 have no description on the reduction of charges of multiply-charged ions generated by the ESI ion source by the ion-ion reaction, but in this method, the ESI ion source and the APCI ion source are disposed in series and the corona discharge electrode of the APCI ion source is exposed on the moving path of the ions. If this method is used to reduce charges of multiply-charged ions by ion-ion reactions, most of multiply-charged ions are attracted and captured by the corona discharge electrode to which a high voltage of the polarity opposite to that of the multiply-charged ions is applied and cease to exist as well as the method of Smith et al.

It is an object of this invention to solve such problems, that is, to provide a mass analysis apparatus that can control the progress of charge reduction by ion-ion reactions and facilitates high efficiency ion-ion reactions in high dynamic ranges.

For the above object, this invention is characterized by a mass analysis apparatus comprising a first ion source which ionizes a sample and produces sample ions, a mass spectrometer which mass-analyzes sample ions that are generated by said first ion source, and a second ion source which is provided between said first ion source and said mass spectrometer apart from the axis of a flow of sample ions discharged from said first ion source to produce ions having a polarity opposite to the polarity of the sample ions, wherein the flow of ions having a polarity opposite to the polarity of the sample ions from said second ion source intersects with the sample ions discharged from said first ion source to said mass spectrometer.

The above apparatus configuration controls ionization periods of said first and second ion sources, mass scanning of said mass spectrometer, and a voltage applied to the corona discharge electrode of said second ion source.

In accordance with the above apparatus configuration, this simple configuration can simplify mass peaks coming from multiply-charged ions of biomolecules and facilitate mass spectrum analyses.

Further, this configuration can also cause stable ion-ion reactions on components which are supplied at ever-changing rates.

DETAILED DESCRIPTION OF THE INVENTION

Description of the Preferred Embodiments

This invention will be described in further detail by way of embodiments. To make the description simpler and clearer, let's assume that the multiply-charged sample ions have a positive polarity and the reactant ions have a negative polarity. When sample ions have a negative polarity, positive reactant ions are used for measurement.

Embodiment 1

Figure 1:
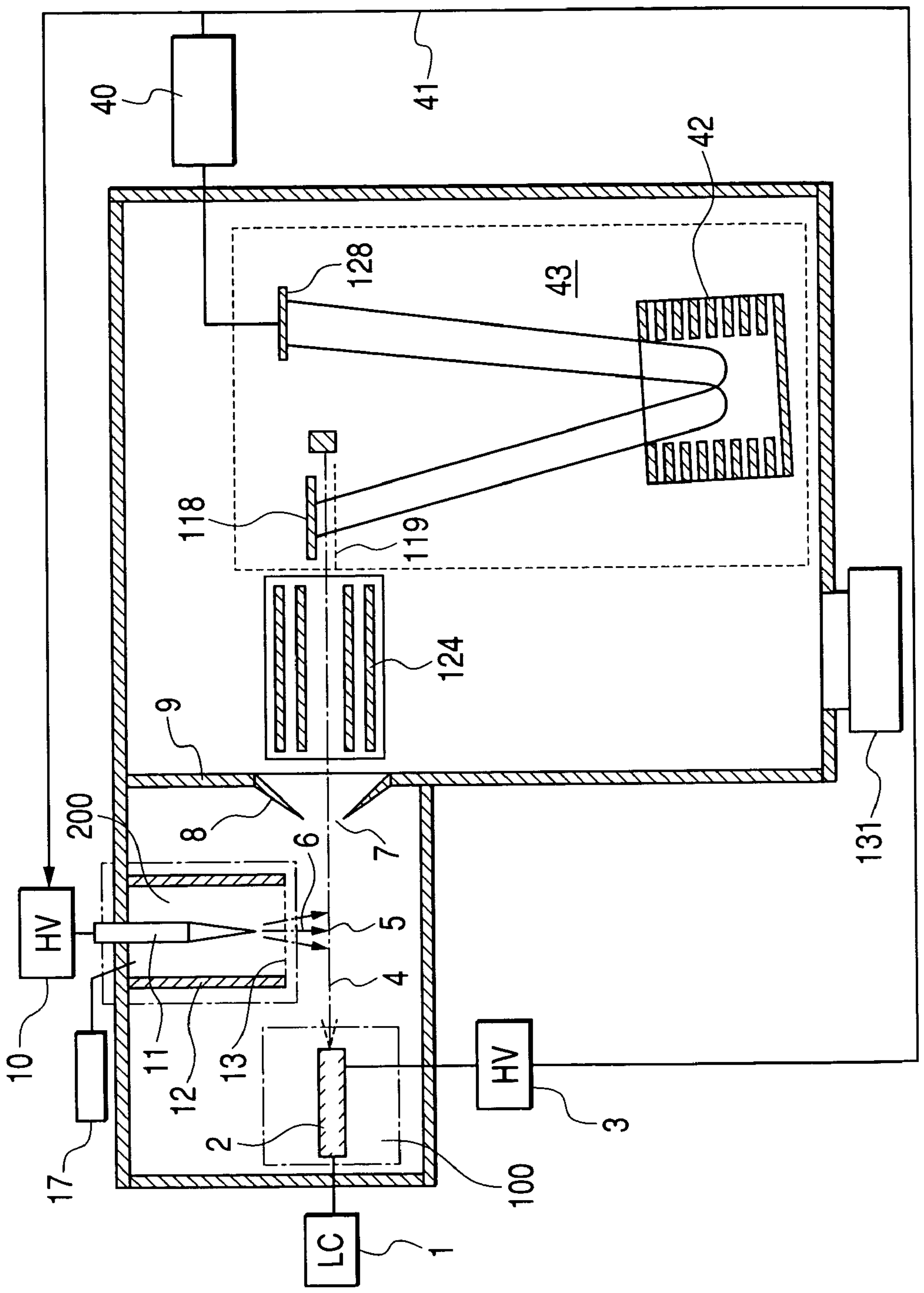
FIG. 1 shows a schematic diagram of a mass analysis apparatus which is the first embodiment of this invention.
Figure 2:
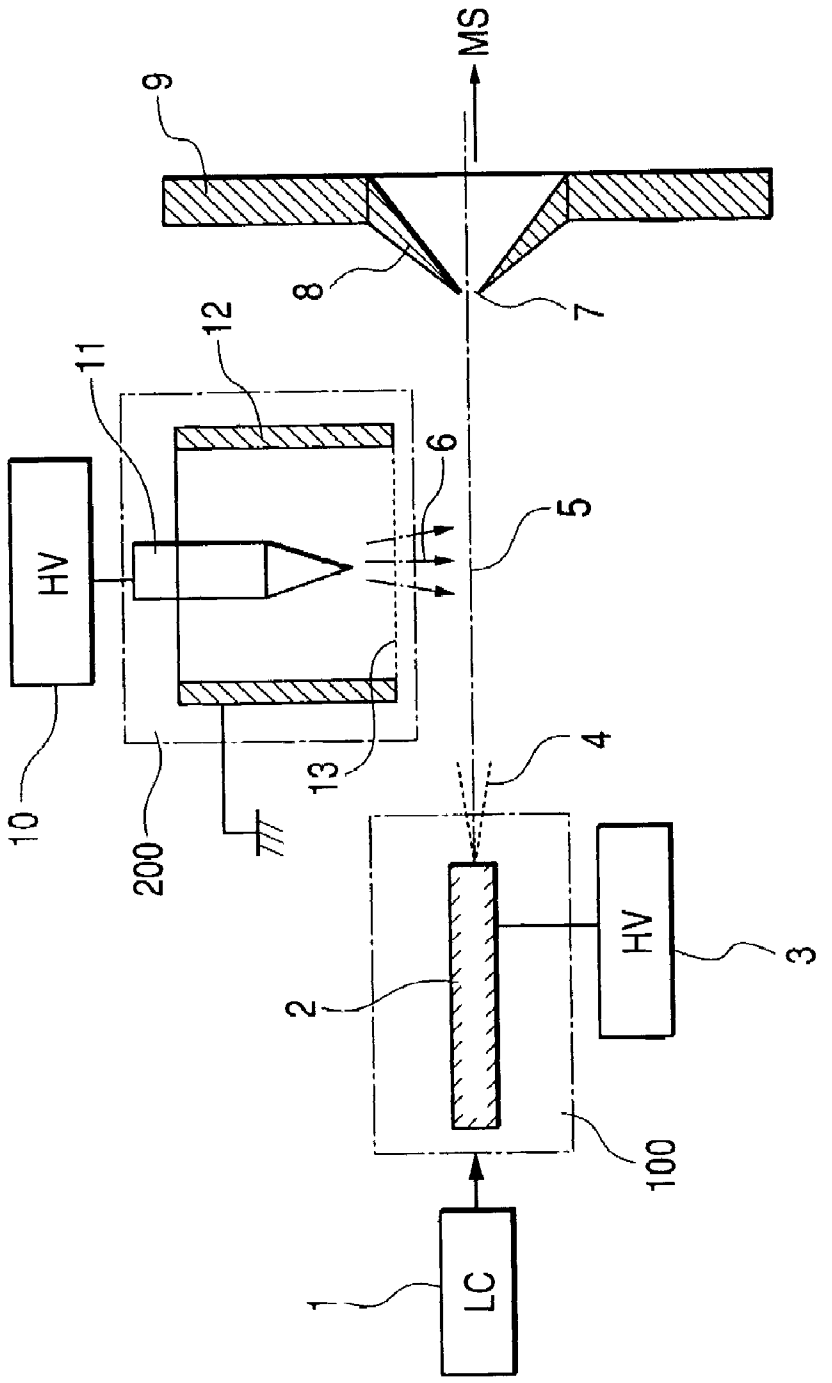
FIG. 2 shows an enlarged sectional view of the ion source of the first embodiment.

FIG. 1 shows a schematic diagram of a mass analysis apparatus which is the first embodiment of this invention and FIG. 2 shows an enlarged sectional view of the ion source of FIG. 1. The sample solution discharged from the liquid chromatograph (LC) 1 reaches the ESI ion source 100 and enters the ESI nebulizer probe 2 to which a positive high voltage is applied from the high voltage power source 3. The sample solution is sprayed and ionized to be a positively charged ion flow 4 of fine spray droplets in the atmosphere. The generated sample ions, that is, positive multiply-charged ions go along the ion beam axis that connects the ESI ion source 100 and the aperture 7 on the top of the skimmer 8 provided on the vacuum partition wall 9 and enters the vacuum chamber of the evacuated mass spectrometer through the aperture 7. The aperture 7 can be substituted by a heated capillary.

The positive multiply-charged ions enters the time-of-flight mass spectrometer (TOFMS) through the ion guide electrode 124 and then the space between the repeller electrode 118 and the ion acceleration electrode 119. The positive multiply-charged ions are pulsated and accelerated by a high voltage applied between these electrodes 118 and 119 and emitted to the TOF space 43. Each of the ions flies in the TOF volume 43 at a speed in reverse proportion to the square root of its mass, is reflected on the reflectron 42, flies again in the TOF space 43, reaches the detector 128 in a light-first heavy-last manner (wherein ions of the lowest molecular weight reaches first and ions of the highest molecular weight reaches last) and detected thereby. The detected ion signals are sent to the data processing unit 40 and collected into a mass spectrum. The TOFMS repeats this mass scanning and gets a lot of mass spectra.

The positive multiply-charged ions flies along the ion beam axis that connects the ESI ion source 100 and the aperture 7 at a subsonic speed of approx. 300 m/sec. The atmospheric pressure chemical ionization (APCI) ion source 200 to create reactant ions is provided apart from the ion beam axis 5. The APCI ion source 200 comprises a corona discharge electrode 11, a shield electrode, a mesh electrode 13, and a corona discharge power supply 10. The shield electrode 12 is made of an electro-conductive metal plate and the mesh electrode 13 is made of an electro-conductive metal mesh. The cylindrical shield electrode 12 is placed covering the needle-shaped corona discharge electrode 11. The shield electrode 12 has an opening to discharge reactant ions facing to the ion beam axis 5 along which the positive multiply-charged ions travel from the ESI ion source. This opening is covered with the mesh electrode 13. The shield electrode 12 and the mesh electrode 13 can be formed in a body with a metallic mesh. These electrodes 12 and 13 are grounded or kept at a low voltage. The mesh electrode 13 is disposed in parallel with the ion beam axis 5. A negative d.c. voltage of 2 to 3 kV is applied to the corona discharge electrode 11 from the corona discharge power supply 10 and consequently a high electric field is produced in the APCI ion source 200. However, this electric field never affects the ion beam axis 5 as the field is shielded by the shield electrode 12 and the mesh electrode 13.

A constant-voltage high-voltage power supply which connects discharge-current limiters of a high resistance (about 10 megaohms) in series is used as the corona discharge power supply 10. It can also be a constant-current high-voltage power supply whose discharge current value can be controlled externally. The discharge current can be controlled by a control signal which is sent from the data processing unit 40 and the like to the corona discharge power supply 10 by means of the control signal line 41. The corona discharge power supply 10 uses this control value to stabilize the discharge current. The corona discharge power supply 10 supplies a high voltage of 2 to 3 kV to the corona discharge electrode 11 whose tip is polished like a needle. A high electric field generates at the end of the needle electrode and corona discharging starts there. This corona discharging produces a lot of negative ions in the space around the tip of the corona discharge electrode 11. These negative reactant ions are accelerated radially by the high electric field in the APCI ion source, made a shower of reactant beams 6 through the mesh electrode 13, and intersect with the ion beam axis 5 of the positive multiply-charged ions. This intersecting region is provided in the upstream side of the aperture 7 and expanded to assure ion-ion reactions.

Generally, gaseous molecules must be fed to the APCI ion source to produce negative ions. However, the LC/MS can produce negative ions without a supply of gaseous molecules because water or alcohol that is a mobile phase of the LC 1 is also fed to the APCI ion source 200 automatically via the ESI ion source 100. The LC/MS produces and supplies negative ions steadily from water or alcohol (such as methanol). When a lot of particular reactant negative ions are required, a gas or solution inlet system 17 is provided to supply a gas to the APCI ion source 200.

Besides the above water and alcohols, nonionic surfactants are well-known as compounds that can produce positive or negative ions by corona discharging of the APCI ion source. When a methanol solution that contains about 1 ppm of nonionic surfactant such as polyethylene glycol (PEG), polypropylene glycol (PPG), or polyethylene glycol sulfate is fed to the APCI ion source 200 from the APCI inlet system 17, the nonionic surfactant is ionized by a negative high voltage applied to the corona discharge electrode 11 of the APCI ion source 200. In the APCI negative ionization mode, polyethylene glycol (PEG), polypropylene glycol (PPG), and polyethylene glycol sulfate produce negative ions as shown by Formulas (7) to (9).

$$\text{PEG: H—(O—CH}_2\text{CH}_2\text{—)n-OH} \rightarrow \text{H—(O—CH}_2\text{CH}_2\text{—)n-O}^- \quad (7)$$

$$\text{PPG: H—(O—CH}_2\text{CH}_2\text{CH}_2\text{—)n-OH} \rightarrow \text{H—(O—CH}_2\text{CH}_2\text{CH}_2\text{—)n-O}^- \quad (8)$$

$$\text{PEG Sulfate: H—(O—CH}_2\text{CH}_2\text{—)n-SO}_4\text{H} \rightarrow \text{H—(O—CH}_2\text{CH}_2\text{—)n-SO}_4^- \quad (9)$$

Various kinds of surfactants have been well known. They are acid surfactants (such as PEG sulfate), basic surfactants (such as PEG amine), and neutral surfactants (such as PEG and PPG). Acid surfactants can be used for generation of negative reactant ions and basic surfactants can be used for generation of positive reactant ions. Neutral surfactants, water, and alcohols such as methanol can generate either positive or negative ions by changing ionization modes (polarities) of the APCI ion source 200. In other words, the polarity of ions generated in the APCI ion source 200 is determined according to the polarity of the voltage applied to the corona discharge electrode. When a positive high voltage is applied to the corona discharge electrode 11, positive ions are generated. Similarly, when a negative high voltage is applied to the corona discharge electrode 11, negative ions are generated. Therefore, neutral surfactants, alcohols, and water are assumed to be ampholyte compounds. By providing an ampholyte compound in the APCI inlet system, you can generate reactant ions of any polarity.

When specimens are changed from protein to DNA, the measurement mode of the mass spectrometer must be switched from Positive Ion mode to Negative Ion mode as DNAs produce negative multiply-charged ions. The data processing unit 40 sends an ionization polarity switch instruction to the power sources of the ESI ion source 100 and the TOF mass analysis apparatus by means of the control signal line 41 and switches polarities. When the polarity of the ESI ion source 100 changes from positive to negative, the polarity of the APCI ion source 200 changes from negative to positive. In this case, the solution for reactant ions must be changed. However, when the solution is any of ampholyte compounds such as alcohols (e.g. methanol) and non-ionic surfactants (e.g. PEG and PPG), the solution need not be changed. In the APCI Positive Ionization mode, PEG and PPG generate positive reactant ions ($BH^+$) as expressed by Formulas (10) and (11).

$$\text{PEG: H—(O—CH}_2\text{CH}_2\text{—)n-OH} \rightarrow \text{H—(O—CH}_2\text{CH}_2\text{—)n-OH}_2^+ \quad (10)$$

$$\text{PPG: H—(O—CH}_2\text{CH}_2\text{CH}_2\text{—)n-OH} \rightarrow \text{H—(O—CH}_2\text{CH}_2\text{CH}_2\text{—)n-OH}_2^+ \quad (11)$$

The produced positive reactant ions ($BH^+$), that is, H—(O—$CH_2CH_2$—)n-$OH_2^+$ and H—(O—$CH_2CH_2CH_2$—)n-$OH_2^+$ work to reduce the charge of the negative multiply-charged ions by the ion-ion reaction (see Formula (12)) with the negative multiply-charged ions $(m-nH)^{n-}$.

$$(m-nH)^{n-} + BH^+ \rightarrow \{m-(n-1)H\}^{(n-1)-} + B \quad (12)$$

The ionization mode switching and the polarity switching of the mass spectrometer are accompanied by polarity switching of many power supplies. These switching operations can be done at a time by polarity switching instructions from the data processing unit 40.

Figure 3:
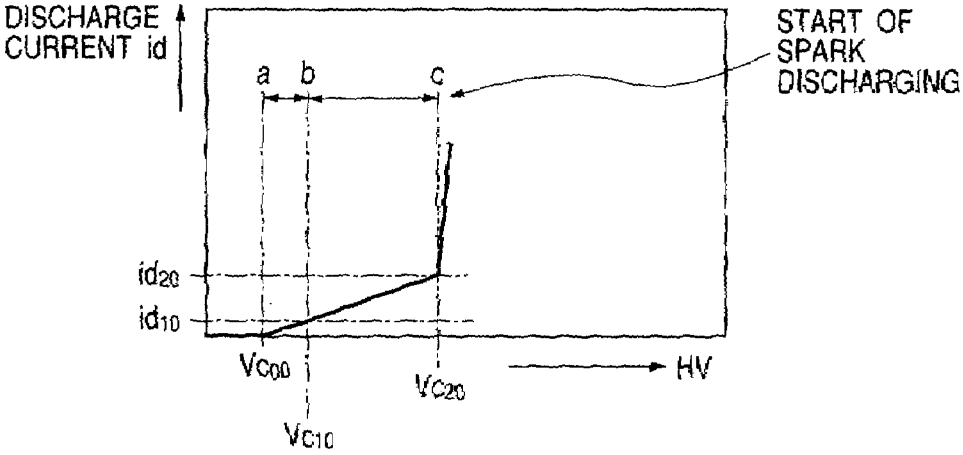
FIG. 3 shows a relationship between a voltage (HV) applied to the corona discharge electrode 11 in the APCI ion source 200 and a discharge current (id).

FIG. 3 shows a relationship between a voltage (HV) applied to the corona discharge electrode 11 in the APCI ion source 200 and a discharge current (id) with the X-axis as the applied voltage (HV) and the Y-axis as the discharge current (id). Here the voltage (HV) is gradually increased from 0. While the voltage (HV) is low, the corona discharge electrode 11 does not cause any corona discharge and the discharge current (id) remains 0. When the voltage (HV) reaches $Vc_{00}$, the corona discharge electrode 11 starts fine corona discharging from its tip and a little current (id) flows. However, during this time range of a-b, the corona discharging is not stable and the discharge current (id) is weak and unstable. When the voltage (HV) reaches $Vc_{10}$, the corona discharging becomes stable and the relationship between the discharge current (id) and the applied current (HV) becomes linear (in the time range of b-c). When the voltage (HV) reaches $Vc_{20}$, the discharge current (id) increases dramatically. This is because the discharge mode changes from Corona Discharge to Spark Discharge. This invention uses corona discharging of the APCI ion source in the b-c time range. In this time range, stable corona discharging continues and the APCI ion source can produce stable reactant ions. The quantity of produced ions is approximately proportional to the intensity of the discharge current (id). Therefore, the quantity of negative reactant ions can be controlled by the discharge voltage (HV) or the discharge current (id).

As corona discharging is a kind of micro discharging, the ionization mode may change by the status of the electrode surfaces such as stains of the corona discharge electrode 11 and oxidization of the electrode material. When a constant quantity of identical reactant ions is required, it is more preferable to control the discharge current (id) by the constant-current high-voltage power supply than to control the applied voltage (HV) by the constant-voltage power supply.

Figure 4:
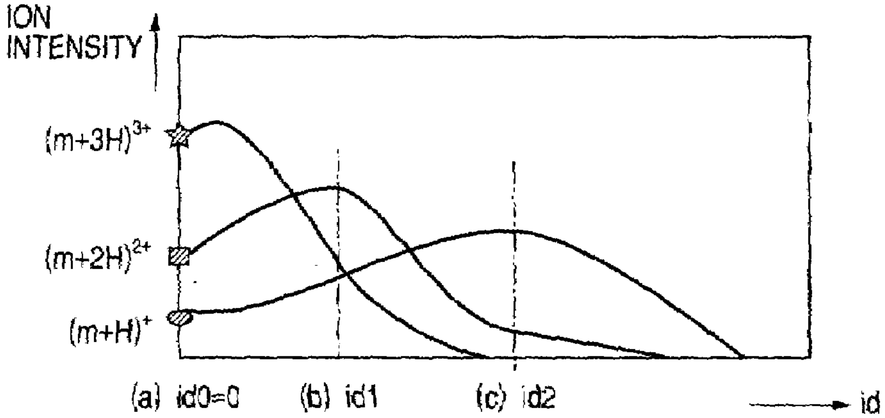
FIG. 4 shows a relationship between ion intensities of single-, double-, and triple-charged ions and discharge currents (id).
Figure 5:
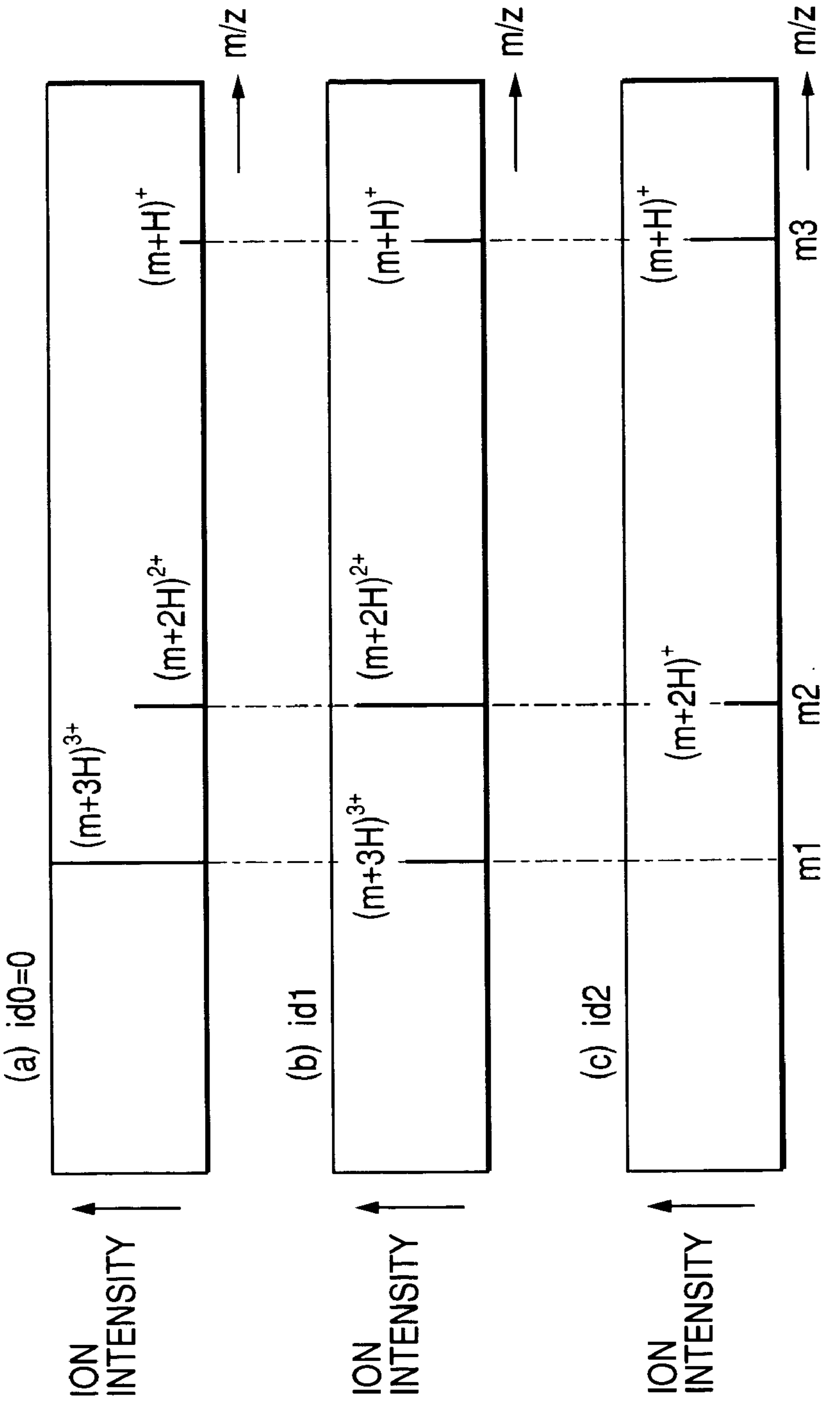
FIG. 5 shows transitions of mass spectra of each APCI discharge current.

FIG. 4 shows a relationship between ion intensities of singe-, double-, and triple-charged ions and discharge currents (id) with the X-axis as the APCI discharge current value (id) and the Y-axis as the intensity of ions on the mass spectrum. The X-axis is also corresponding to the quantity of negative reactant ions. FIG. 5 shows transitions of mass spectra of APCI discharge currents id0, id1, and id2

Figure 24:
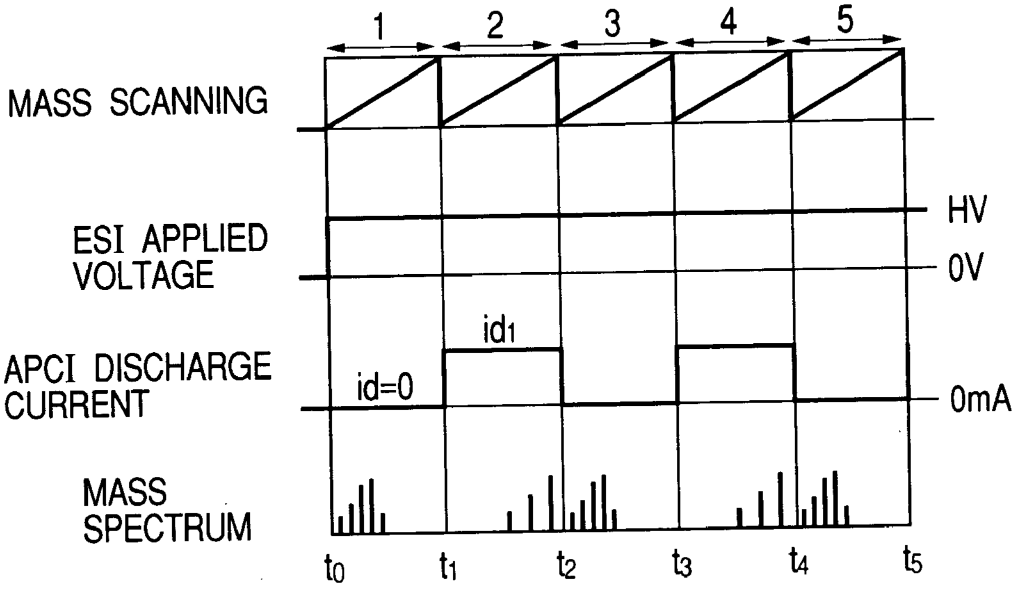
FIG. 24 illustrates a controlling method of this invention.

When the APCI ion source is not working (that is, the APCI discharge current (id) is 0), the ratio of ion intensities of triple-, double-,and single-charged ions on the mass spectrum (sequentially from the low mass region) is approximately 4:2:1 as shown in FIG. 24(*a*). At the APCI discharge current id1 (see FIG. 24(*b*)), the ion intensity of triple-charged ions quickly falls down to about 50% of the ion intensity of triple-charged ions of FIG. 24(*a*). Contrarily, the ion intensity of double-charged ions goes up to about 150% of the ion intensity of double-charged ions of FIG. 24(*a*). Similarly, the ion intensity of single-charged ions goes up to about 160%. When the discharge current (id) is further increased to id2, a mass spectrum of FIG. 24(*c*) is obtained. In this mass spectrum, we can find that the ion intensity of single-charged ions is the highest and that the ion intensity of double-charged ions is reduced down to about one third of the ion intensity of single-charged ions. The peak of the triple-charged ions no longer exists on the mass spectrum.

Judging from the above, it is known that the obtained mass spectrum varies by changing the quantity of negative reactant ions to be applied to positive ions generated by the ESI. Further, it is known that the ion-ion reactions advance in sequence from ions having a greater charge number. Therefore, we can estimate the number of charges of an ion as the ion-ion reaction is affected by the number of charges.

Figure 6:
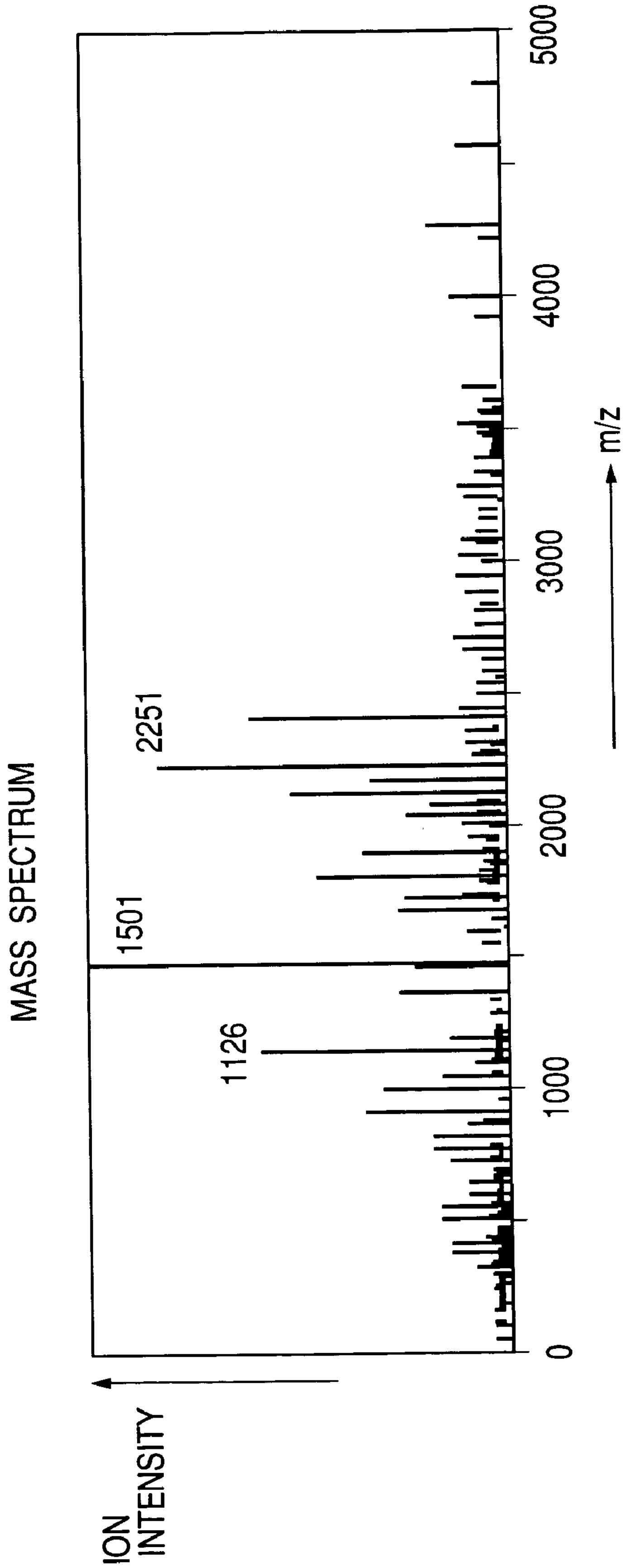
FIG. 6 shows an example of mass spectrum obtained by the first embodiment.
Figure 7:
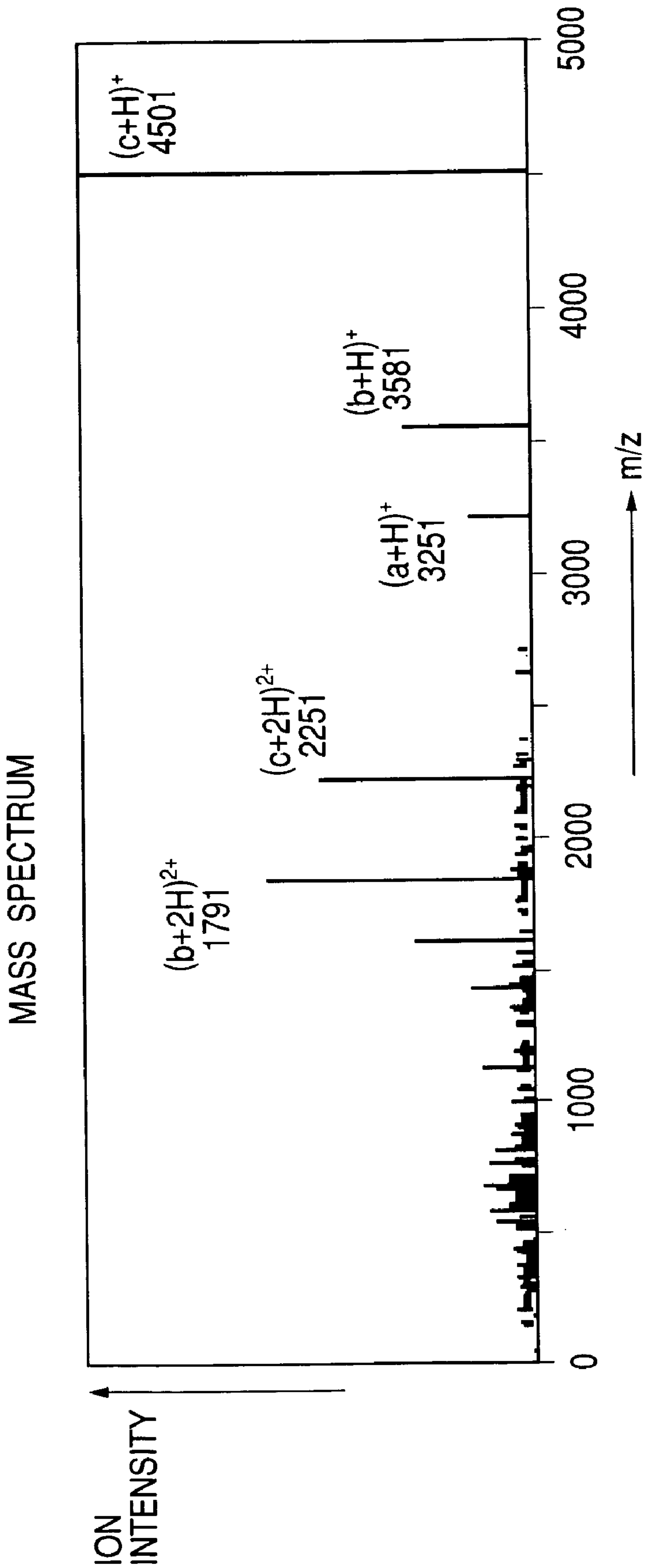
FIG. 7 shows an example of mass spectrum obtained by the first embodiment.
Figure 8:
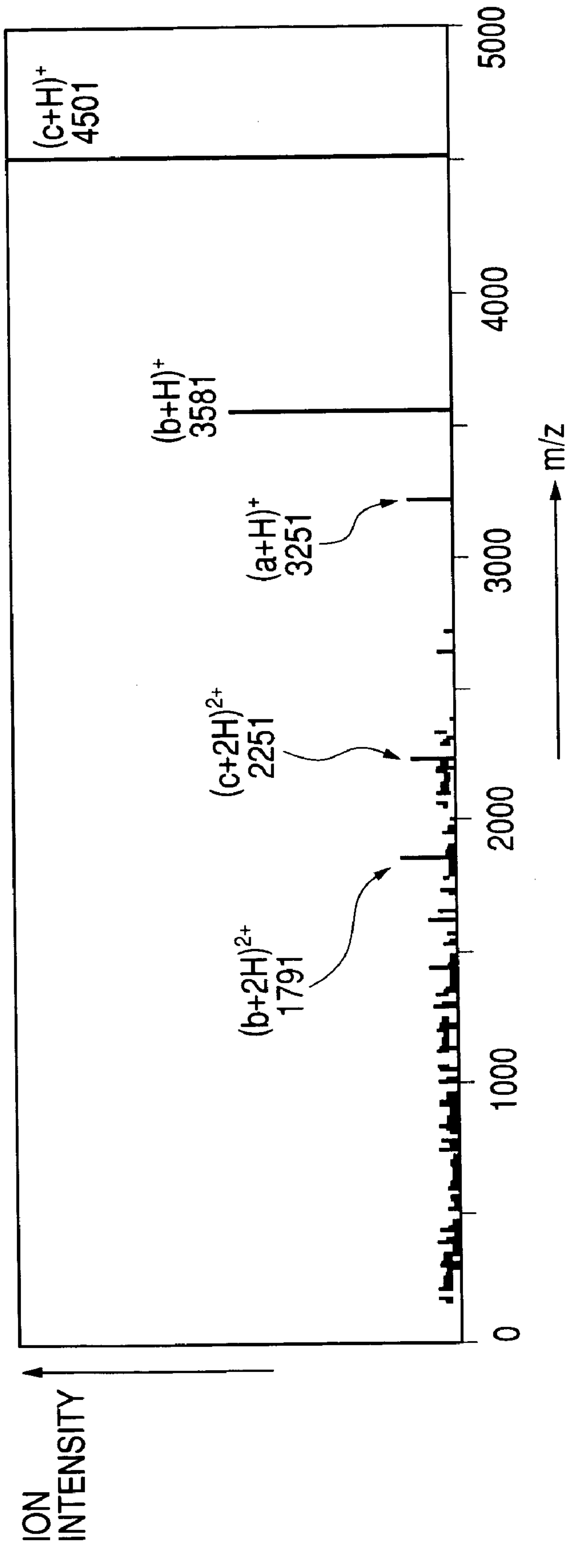
FIG. 8 shows an example of mass spectrum obtained by the first embodiment.

FIG. 6, FIG. 7, and FIG. 8 respectively show examples of mass spectra obtained by the mass analysis apparatus of this first embodiment.

FIG. 6 shows an example of ESI mass spectrum of a certain specimen fed from the LC 1. In this example, the mass analysis apparatus causes the data processing unit 40 to send a signal to stop the corona discharge current (=0) to the corona discharge power supply 10 to stop corona discharging of the APCI ion source 200. Consequently, the ion flow 4 produced by the ESI ion source 100 passes by the APCI ion source 200 and enters the TOF mass spectrometer through the aperture 7. The obtained mass spectrum contains a lot of peaks. The m/z region of 1000 or less contains chemical noises (single-charged ions) due to impurities. Although great mass peaks are found in the mass region of 1000 or more, it is difficult to estimate their charge numbers and their origins because of a lot of chemical noises. If the concentration of the specimen is low, it is usually difficult to analyze mass spectra obtained by the ESI (except when the concentrations of components fed to the ESI are high enough).

FIG. 7 shows an example of mass spectrum of the same specimen obtained by ionizing the specimen by the ESI ion source and applying negative ions to the specimen ions to cause ion-ion reactions. In this example, the data processing unit 40 sends a control signal to control the discharge current to 1 mA to the corona discharge power supply 10. The APCI ion source 200 starts corona discharging and its discharge current is kept at 1 mA. The negative reactant ions produced by the APCI ion source are emitted from the APCI ion source towards the ion beam axis 5 of ions generated by the ESI and cause ion-ion reactions.

By comparing mass spectra of FIG. 6 and FIG. 7, we can see that ion intensities of mass peaks in the m/z region of 2,000 or less become less. This is because the single-charged ions including chemical noise in this mass region reduce their charges by ion-ion reactions. It is assumed that triple and more charged ions from the specimen moved to the high mass region. The mass spectrum contains the ions at m/z values of 1791, 2251, 3251, 3581, and 4501. We could identify at least three components a, b, and c. We can interpret that components at m/z values of 1791 and 2251 are respectively double-charged ions of components b and c, but we need more mass spectra to say it with certainty. Further there may still be a possibility that they are single-charged ions of the fourth or fifth component. To clarify the origins of these ions, we must obtain mass spectra using more quantities of negative ions for ion-ion reactions.

FIG. 8 shows an example of mass spectrum using a discharge current of 2 mA from the data processing unit 40. This mass spectrum is very simple as most of low-mass peaks due to chemical noises disappeared.

By comparing mass spectra of FIG. 7 and FIG. 8, we can see that mass peaks due to three single-charged components a, b, and c still remain at m/z values of 3251, 3581, and 4501. However, mass peaks at m/z values of 1791 and 2251 which are assumed to be double-charged ions greatly lost their ion intensities. Further, no other mass peak (than those at m/z values of 3251, 3581, and 4501) appears in the high mass region of m/z=2500 or more. From these, we identified the existence of three components a, b, and c and their molecular weights (3250, 3580, and 4500 in that order).

Figure 9:
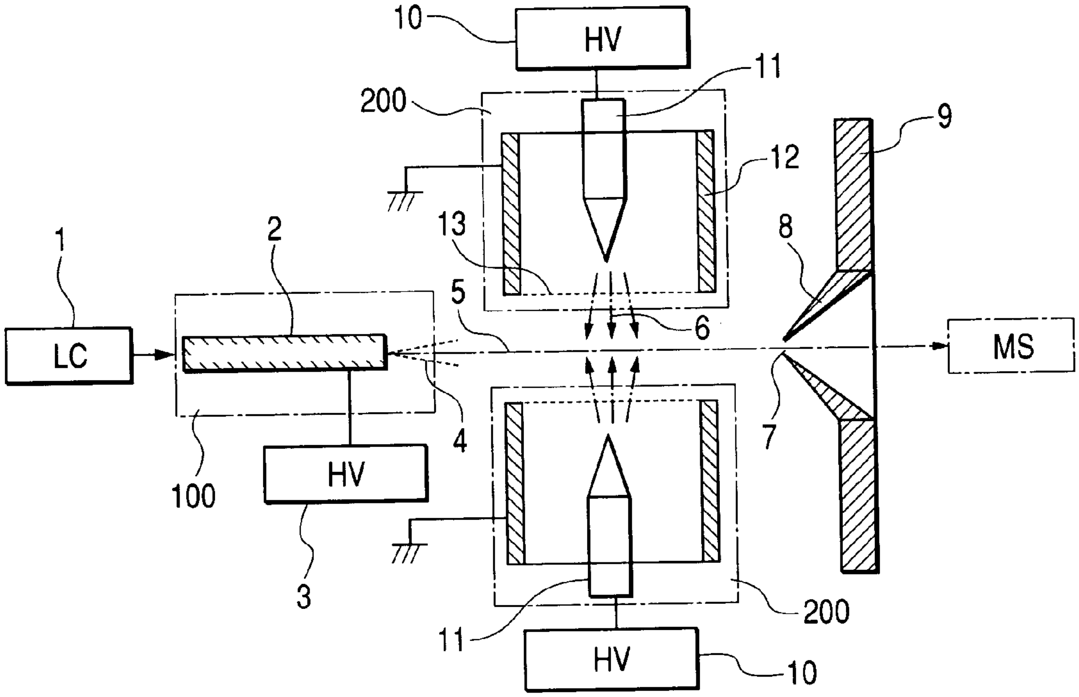
FIG. 9 shows an enlarged sectional view of another ion source of the first embodiment.

FIG. 9 shows a device configuration of another ion source of the first embodiment. This configuration is similar to those of FIG. 1 and FIG. 2 except that two or more APCI ion sources 200 and 200' are radially provided at intervals around the ion beam axis 5. Two APCI ion sources can be provided at intervals of 180 degrees or four APCI ion sources can be provided at intervals of 90 degrees. The APCI ion sources of FIG. 9 for production of reactant ions are similar to those of FIG. 1 and FIG. 2 in configuration. The corona discharge power supplies 10 and 10' are respectively connected to the corona discharge electrodes 11 and 11'. This enables independent control of discharge currents of the ion sources and facilitates ion-ion reactions. The APCI ion sources 200 and 200' produce negative ions (reactant ions) in the similar manner and emits the negative ions to intersect with the ESI ion beam axis 5. The positive ions coming from the specimen react with the negative reactant ions (ion-ion reactions) and reduce their charges. The charge-reduced ions are sent to the mass spectrometer (MS) disposed in vacuum through the aperture 7 and mass-analyzed there. The embodiment of FIG. 1 and FIG. 2 is designed to intersect reactant ions emitted from one APCI ion source 200 to intersect with a beam of positive multiply-charged ions generated by the ESI. In other words, the negative reactant ions hit the ESI ion beam axis 5 from only one side of the axis. The ion-ion reactions take place only in a space where both positive and negative ions intersect with each other. Outside this intersecting region, the ion-ion reaction will no longer take place. Therefore, it is necessary to complete ion-ion reactions quickly in this intersecting region. Particularly, the efficient ion-ion reactions are required when the quantity of a specimen (like a specimen fed from the LC) is not known. The embodiment of FIG. 9 can apply reactant ions to the ESI ion beam axis 5 from two directions (up and down) or from four directions (up, down, left, and right). This assures efficient ion-ion reactions.

Embodiment 2

Figure 10:
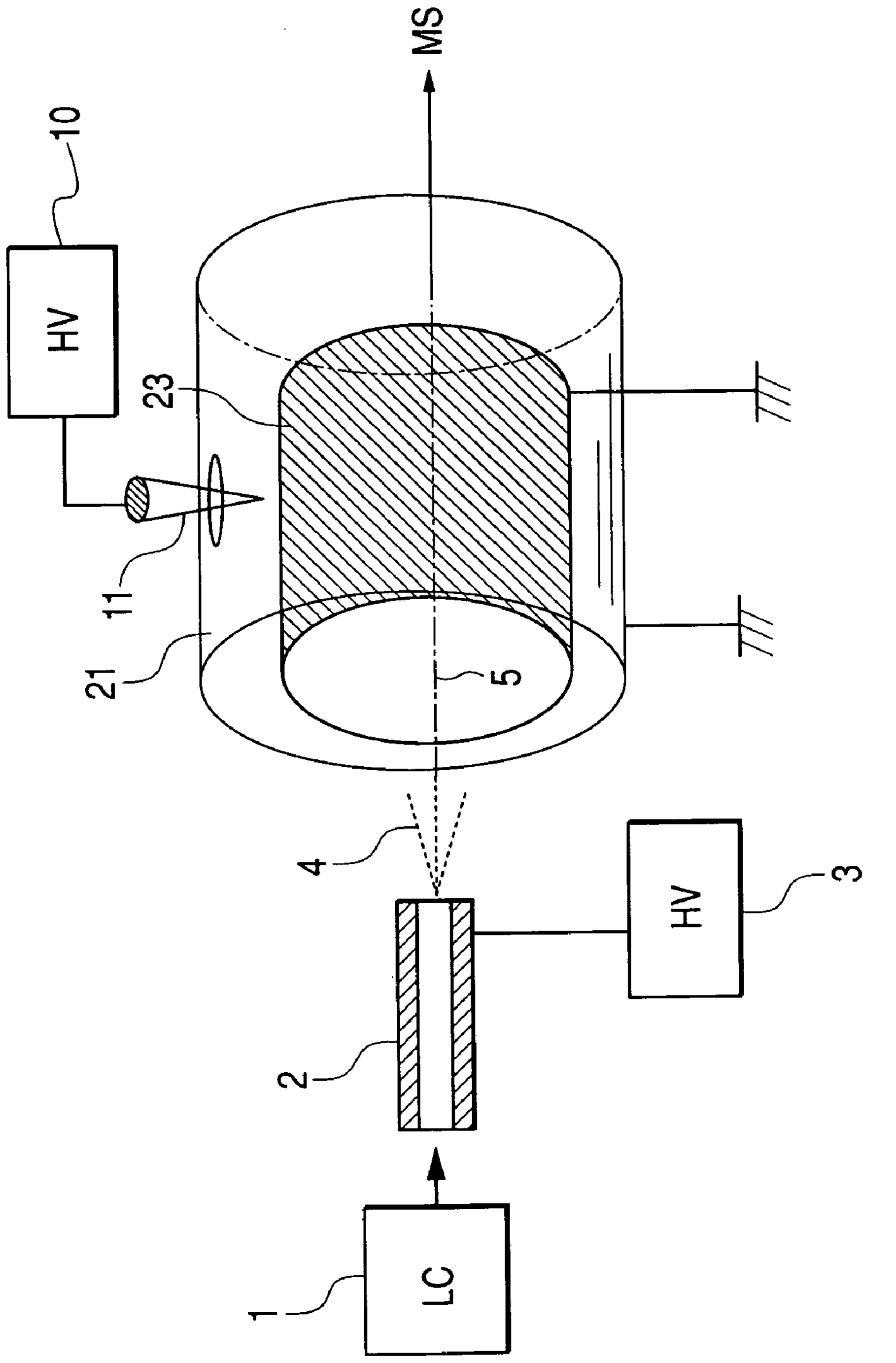
FIG. 10 shows an enlarged sectional view of the ion source of the second embodiment.

FIG. 10 shows a device configuration of the atmospheric pressure ion source of the second embodiment. While Embodiment 1 employs the configuration of an APCI ion source 200 for production of reactant ions in which the ESI ion beam is not affected by a high voltage applied to the corona discharge electrode 11, Embodiment 2 employs another configuration of the APCI ion source.

When receiving a specimen solution, the ESI nebulizer probe 2 nebulizes it into a flow 4 of charged droplets (nebulized ion flows) in the air by a high voltage applied to the ESI nebulizer probe 2. The charged droplets fly in the air along the ion beam axis 5. A cylindrical mesh electrode 23 (about 20 mm long, 10 mm in diameter) made of an electro-conductive metallic mesh is provided with the ion beam axis 5 as the central axis of the cylindrical mesh electrode 23. Further a cylindrical metallic electrode 21 having a greater diameter than the cylindrical mesh electrode 23 is provided concentrically with the cylindrical mesh electrode 23. This cylindrical metallic electrode 21 is about 20 mm long by 30 mm in diameter. The cylindrical mesh electrode 23 is inside the cylindrical metallic electrode 21. These cylindrical electrodes 21 and 23 can be made up in a body or separately with different parts because these electrodes are kept at a ground potential or a low potential. A corona discharge electrode 11 is provided in a space between the cylindrical mesh electrode 23 and the cylindrical metallic electrode 21. To avoid discharging between the cylindrical metallic electrode 21 which is grounded and the corona discharge electrode 11 to which a high voltage is applied, an opening is provided on the cylindrical metallic electrode 21 and the corona discharge electrode is supported in the opening by an insulating material. The ion beam comes into the cylindrical mesh electrode 23 along its central axis through the opening of the cylindrical mesh electrode 23 and flies into the mass spectrometer through the aperture.

Figure 11:
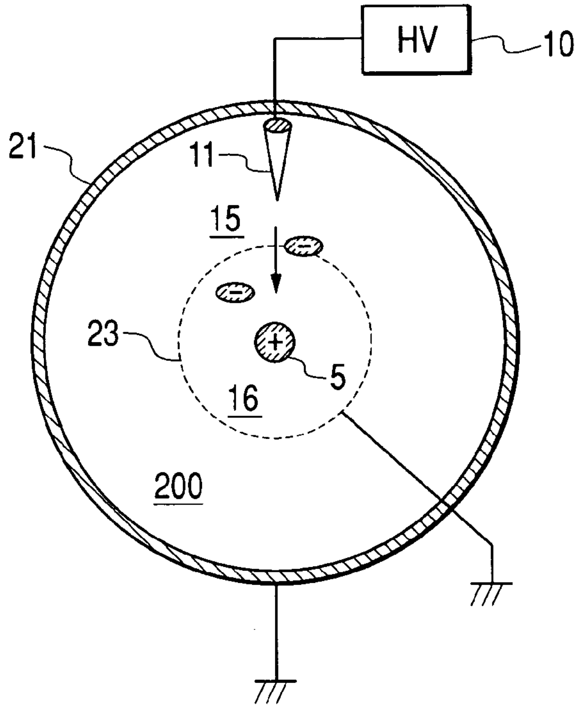
FIG. 11 shows a sectional view of the APCI ion source of FIG. 10.

FIG. 11 shows a sectional view of the APCI ion source of FIG. 10. The ion beam 5 coming into the cylindrical mesh electrode 23 goes into the paper. The grounded cylindrical mesh electrode 23 is provided to enclose the ion beam axis 5. The corona discharge power supply applies a negative high voltage of about 2 to 3 kV to the corona discharge electrode 11 to cause corona discharging at the tip of the corona discharge electrode 11. The negative ions generated at the tip of the corona discharge electrode 11 are accelerated by the electric field and fly into the space 16 within the cylindrical mesh electrode 23 through the mesh 23. At the center of the cylindrical mesh electrode 23, the negative reactant ions intersect with the beam axis 5 of positive ions generated by the ESI and ion-ion reactions take place. As the result, the positive ions reduce their charges, are fed to the mass spectrometer, and mass-analyzed there.

In Embodiment 1, the APCI ion source is enclosed in a grounded shield electrode so that the ESI ion beam may not be affected by the high voltage applied to the corona discharge electrode. However, the electrodes enclosing the ion-ion reaction space in which positive and negative ions intersect with each other are not always at a grounding potential. Further, the electrodes are not disposed symmetrically with the ESI ion beam axis. Therefore, the electric field in the ion-ion reaction space may not be even. In this case, this unevenness of the electric field may affect the ion-ion reactions and the efficiency of supply of ions to the mass spectrometer. Contrarily, Embodiment 2 is so constructed that the ESI ion beam axis 5 may be the axis of symmetry of the mesh electrode 23. This can make the electric field even in the mesh electrode 23 and eliminate an influence of the electric field on the ion beam axis 5.

Figure 12:
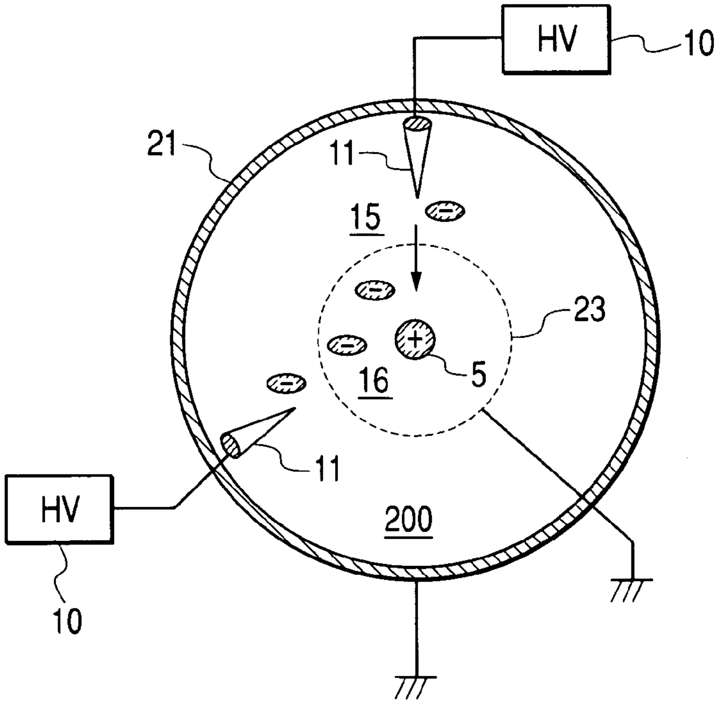
FIG. 12 shows a modification example of the apparatus of FIG. 10.

FIG. 12 shows a modification example of the apparatus of FIG. 10. While the apparatus of FIG. 10 uses only one tip of the corona discharge electrode 11 to produce corona discharges, Embodiment 2 uses two or more corona discharge electrodes 11 and 11' radially around the ESI ion beam axis 5 with the beam axis as its center. Corona discharge power supplies 10 and 10' are independently connected to the corona discharge electrodes 11 and 11'.The negative reactant ions produced by corona discharging by the corona discharge electrodes and their vicinities are accelerated towards the ESI ion beam axis 5 from the APCI space 15 through the cylindrical mesh electrode 23 and enter the space 16 within the cylindrical mesh electrode 23. Two or more discharging electrodes as in this embodiment can apply more negative reactant ions to the ESI ion beam than one discharging electrode, consequently increase the quantity of negative reactant ions in the ion-ion reaction space in which positive and negative ions intersect with each other, and thus assures the ion-ion reactions. This can assure the ion-ion reactions also when a lot of positive ions are supplied.

Embodiment 3

Figure 13:
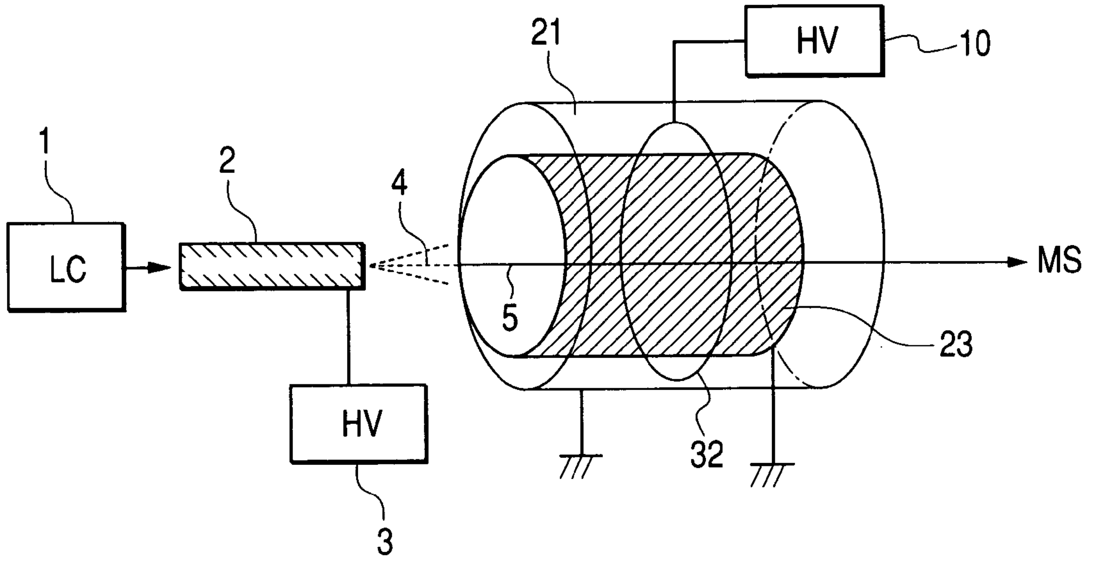
FIG. 13 shows an enlarged sectional view of the ion source of the third embodiment.
Figure 14:
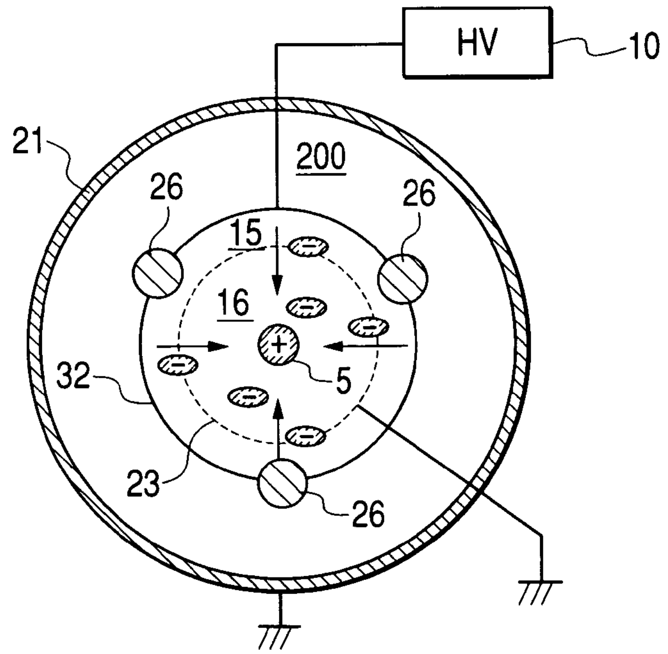
FIG. 14 shows a sectional view of the APCI ion source of FIG. 13.

FIG. 13 shows a device configuration of the ion source of the third embodiment in accordance with this invention. FIG. 14 shows a sectional view of the APCI ion source of Embodiment 3. Similarly to Embodiment 2, the cylindrical mesh electrode 23 and the cylindrical metallic electrode 21 are provided concentrically around the ESI ion beam axis between the ESI probe 2 and the ion aperture 7. The cylindrical mesh electrode 23 and the cylindrical metallic electrode 21 are kept at a ground potential. A thin metallic wire ring 32 which is greater in diameter than the mesh electrode 23 but smaller than the metallic electrode 21 is interposed between the electrodes 23 and 21 with its center on the ESI ion beam axis 5. When the mesh electrode 23 is 10 mm in diameter and the cylindrical electrode 21 is 30 mm in diameter, the metallic thin ring 32 can be 15 to 18 mm in diameter. This metallic thin ring 32 is supported by a plurality of columns 26, 26', and 26". The metallic thin ring 32 is disposed to circle the mesh electrode 23. The metallic thin ring 32 is preferably made of an oxidation-resistant metal wire such as tungsten (W), rhenium (Re), platinum (Pt), gold (Au), and tantalum (Ta) of 0.5 mm or less in diameter, preferably 0.3 to 0.1 mm. This metallic thin ring 32 generates a high electric field and corona discharging around itself. The negative reactant ions generated on a plurality of discharging areas on the metallic thin ring 32 are accelerated towards the center of the mesh electrode 23 by the electric field between the metallic thin ring 32 and the mesh electrode 23. The negative reactant ions enter the mesh electrode 23 and go across the ESI ion beam axis 5. As the result of ion-ion reactions, positive multiply-charged ions reduce their charges.

This embodiment can dispose corona discharging areas almost evenly around the mesh electrode 23 with the metallic thin ring 32 and assure ion-ion reactions in the ion-ion reaction space in which positive and negative ions intersect with each other. This can assure ion-ion reactions also when the quantity of ESI ions on the ion beam axis 5 changes greatly.

Figure 15:
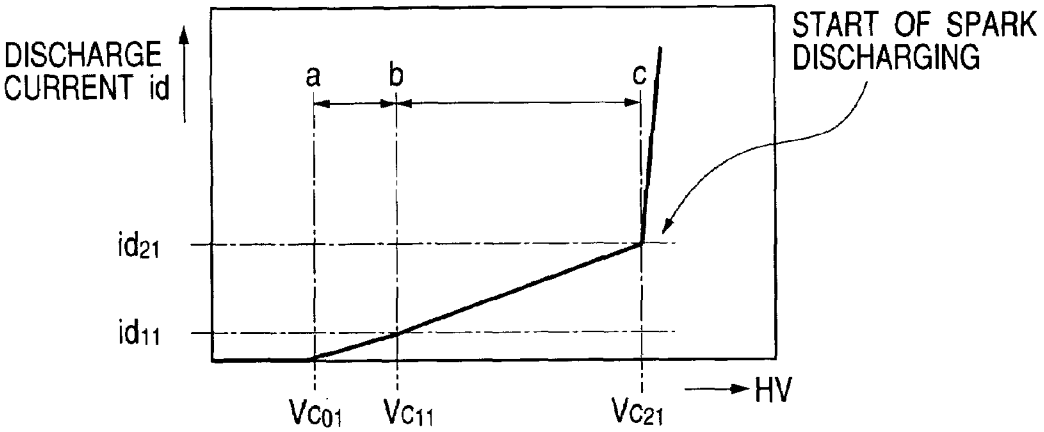
FIG. 15 shows a relationship between a voltage (HV) applied to the corona discharge electrode (metallic thin ring 32) and a discharging current (id).

FIG. 15 shows a relationship between a voltage (HV) applied to the corona discharge electrode (the metallic thin ring 32) and a discharging current (id) in Embodiment 3. This HV-id relationship is very similar to that of FIG. 3 using a needle-shaped corona discharge electrode. However, the applied voltage (HV) in this relationship is higher at points “a” (discharge-starting point), “b” (stable-discharge starting point), and “c” (spark-discharge starting point) than those of FIG. 3. Further, the discharge currents at points “b” (stable-discharge starting point) and “c” (spark-discharge starting point) are about 180% of those of FIG. 3. Therefore, the metallic thin ring 32 as a corona discharge electrode can greatly expand the stable discharge control range (b-c in the HV axis) in comparison with the needle-shaped electrode and further can increase the quantity of the produced reactant ions almost twice as much as that of the needle-shaped electrode.

Figure 16:
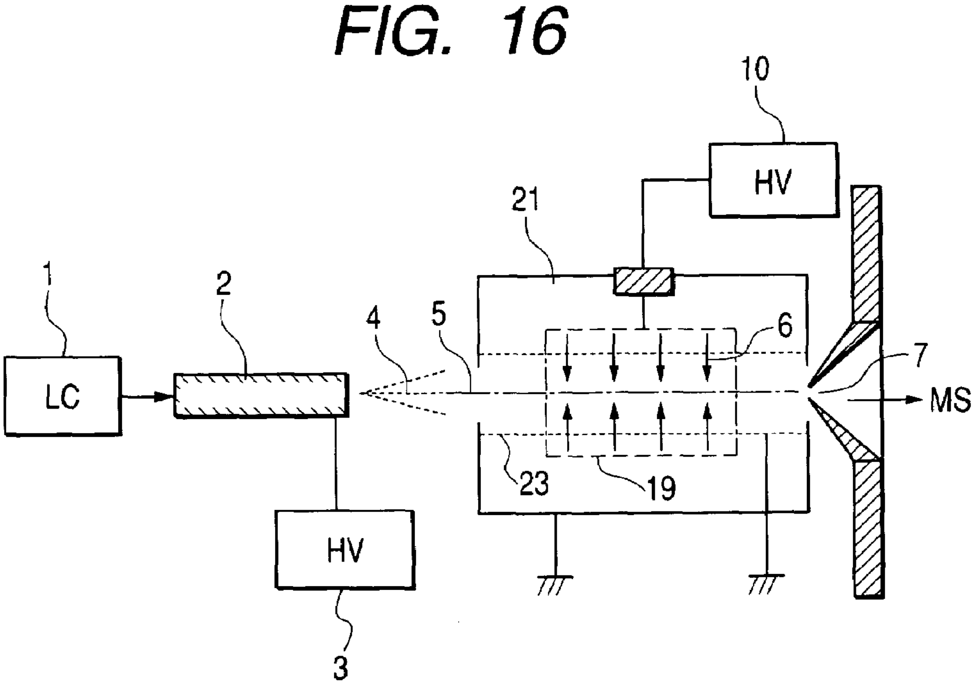
FIG. 16 shows a modification example of the third embodiment of this invention.

FIG. 16 shows a modification example of the third embodiment of this invention. This embodiment uses a metallic mesh similar to the cylindrical mesh electrode 23 instead of the thin metallic ring.

A corona discharging mesh electrode 19 which is a metallic mesh cylinder of 15 mm long and 15 to 18 mm in diameter is interposed between the mesh electrode 23 and the cylindrical electrode 21 which are kept at a ground potential. The corona discharge power supply 10 applies a high voltage to the corona discharging mesh electrode 19. The corona discharging mesh electrode 19 can produce corona discharges on the whole surface of the mesh electrode 19. This embodiment can expand a space in which positive and negative ions intersect with each other, that is, the ion-ion reaction space. This can assure the ion-ion reaction. Further, this embodiment can increase the discharge current (id) further and assure the ion-ion reactions also when a lot of ESI ions are supplied into the APCI ion source.

Embodiment 4

Figure 17:
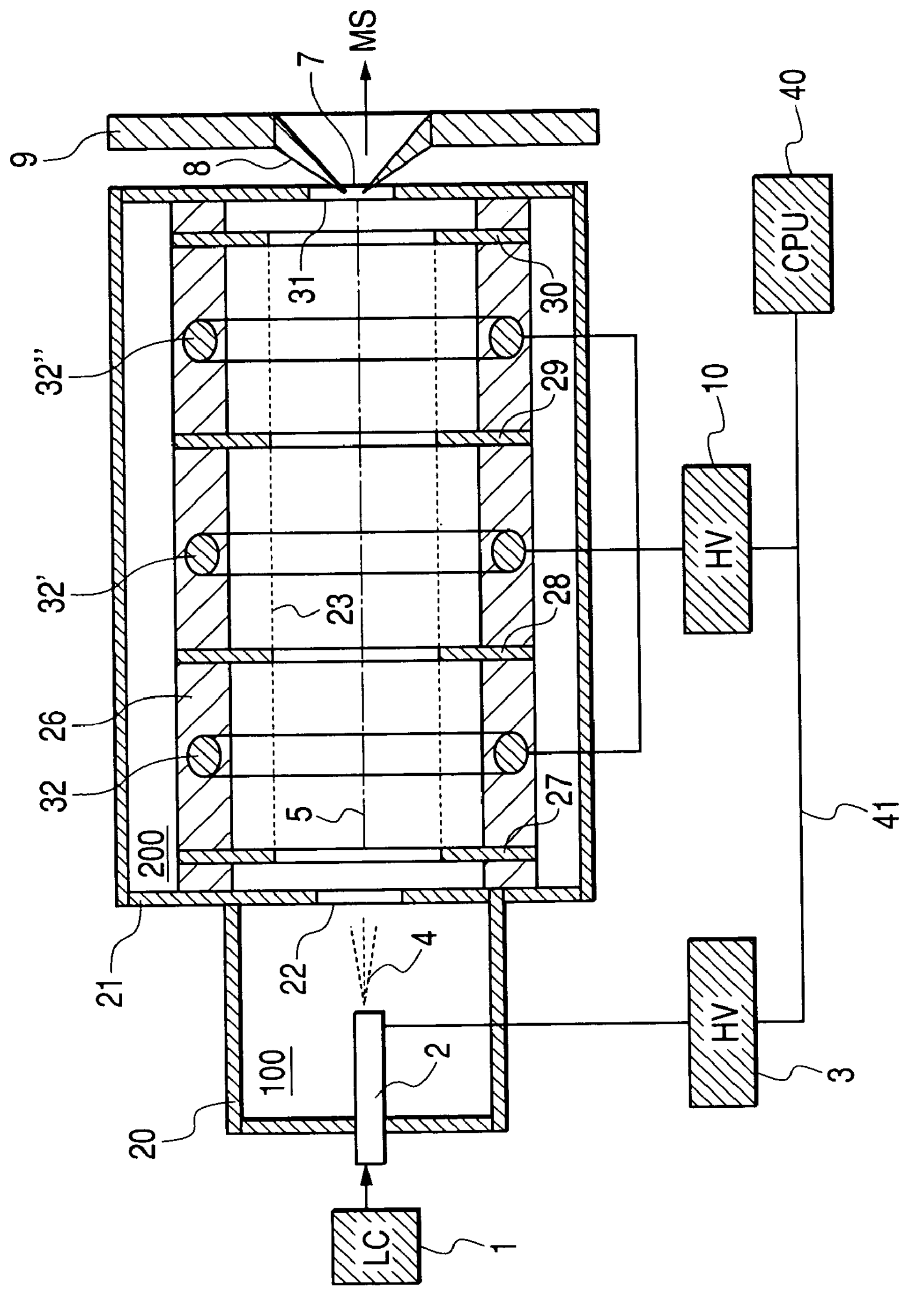
FIG. 17 shows an enlarged sectional view of the ion source of the fourth embodiment.

FIG. 17 shows an enlarged sectional view of the ion source of the fourth embodiment.

This embodiment uses a plurality of metallic thin wires for the corona discharge electrode of the APCI ion source. Similarly to Embodiments 2 and 3, the cylindrical mesh electrode 23 and the cylindrical metallic electrode 21 are provided concentrically around the ESI ion beam axis 5 between the ESI probe 2 and the ion aperture 7. The cylindrical mesh electrode 23 and the cylindrical metallic electrode 21 are kept at about a ground potential. Two or more thin metallic wire rings each of which is greater in diameter than the mesh electrode 23 but smaller than the metallic electrode 21 are interposed between the electrodes 23 and 21 with its center on the ESI ion beam axis 5. The wire rings are disposed downward (towards the aperture 7) at proper intervals along the ESI ion beam axis. Metallic shielding electrodes 27, 28, 29, and 30 are provided so that each metallic wire ring 32, 32', and 32" may be sandwiched between the shielding electrodes. With these mesh electrodes 23, the shielding electrodes 27, 28, 29, and 30, and the cylindrical electrode 21, two or more independent APCI ionization chambers (three chambers in FIG. 17) are prepared. Each APCI ionization chamber contains one thin metallic wire ring (32, 32', or 32") for corona discharging to which the corona discharge power supply 10 applies a high voltage of about 3 kV. Consequently, the thin metallic wire rings (32, 32', and 32") produce corona discharges around them.

Figure 18:
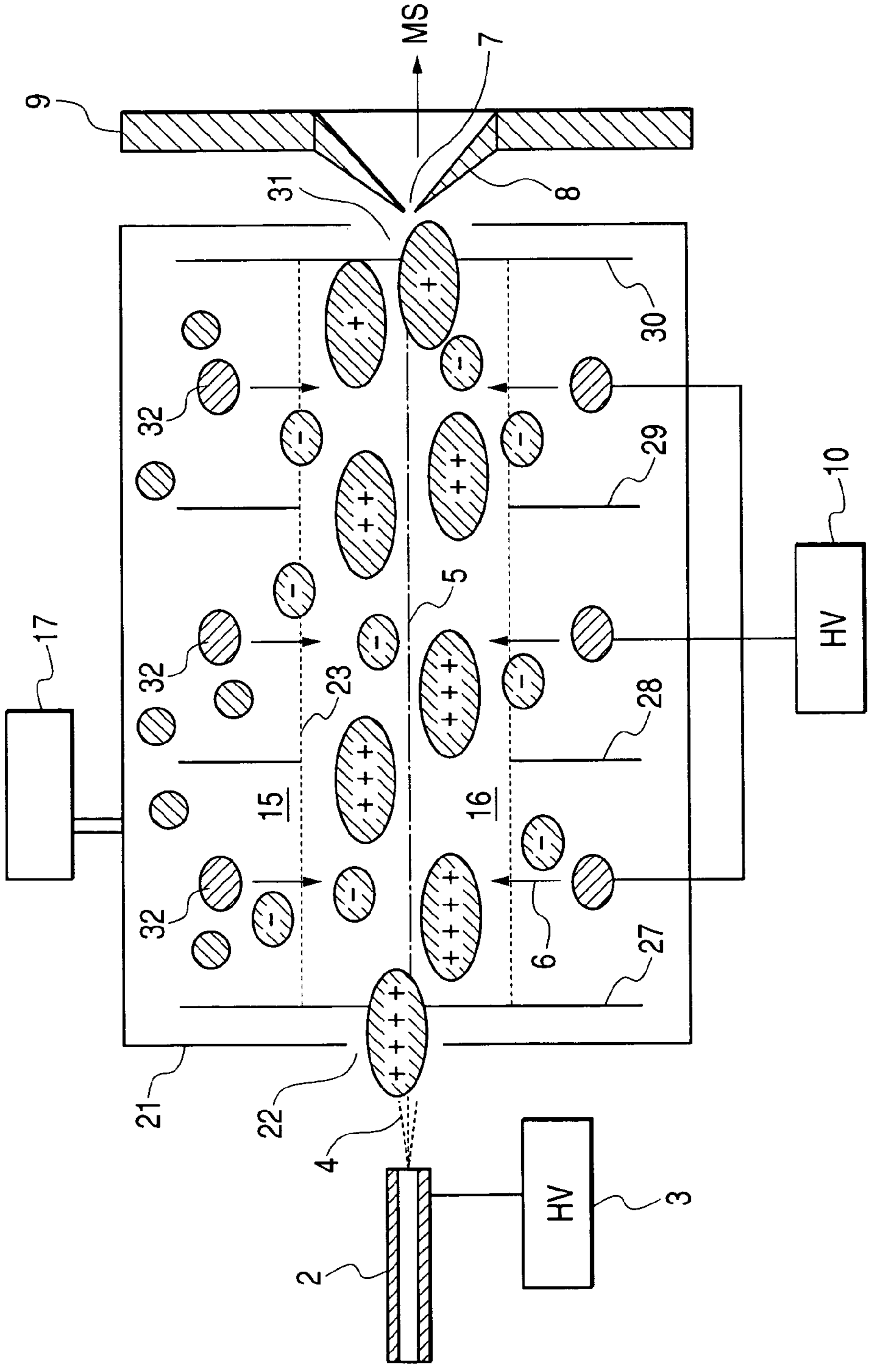
FIG. 18 shows an operational diagram of the fourth embodiment.

FIG. 18 shows an operational diagram of the fourth embodiment.

A flow 4 of ions nebulized and ionized by the ESI probe 2 is fed into the APCI ion source through the opening made on the wall of the cylindrical electrode 21. Next, the positive multiply-charged ions are carried into the space inside the mesh electrode 23. The positive multiply-charged ions fly along the ESI ion beam axis 5 in the mesh electrode 23 into the evacuated mass spectrometer through the aperture 7 provided at the tip of the skimmer 8 on the vacuum partition wall 9. The thin metallic wire rings 32 produce a high electric field by a negative high voltage applied to the wire rings 32. Corona discharging starts with this and a lot of negative ions generate near the thin metallic wire rings 32. The negative ions are accelerated towards the ESI ion beam axis 5 by the potential between the thin metallic wire rings (32, 32', and 32") and the grounded electrodes (mesh electrode 23 and shielded electrodes 27, 28, 29, and 30). The negative ions passing through the mesh electrode 23 enter the mesh electrode, hit the ESI ion beam axis 5, and cause ion-ion reactions. This embodiment can apply negative ions to the positive multiply-charged ions three times. The multiply-charged ions fly in the mesh electrode 23 towards the aperture 7 while reducing their charges. Any positive multiply-charged ions flying through the first APCI ionization chamber without colliding with negative ions (without causing any ion-ion reaction) will possibly collide with negative ions in the second or third APCI ionization chamber. In other words, multiply-charged ions undergo subsequent irradiations of negative ions generated by corona discharging of the thin metallic wire rings 32' and 32". This assures the ion-ion reactions. As the result, multiply-charged ions can reduce their charges surely and steadily.

In accordance with this embodiment, the multiply-charged ions generated by the ESI undergo irradiations of reactant ions several times. We can control the progress of ion-ion reactions by sending control signals from the data processing unit 40 to the corona discharge power supply 10 and controlling the charge current or the applied voltage.

Further, we can assure the production of negative ions during APCI ionization by providing an APCI inlet system 17 outside the cylindrical electrode 21, supplying a non-ionic surfactant such as alcohols (e.g. methanol) and polyethylene glycol to the cylindrical electrode 21 and producing negative ions steadily by the APCI. Non-ionic surfactants such as alcohols and polyethylene glycol are ampholyte compounds that can produce either negative or positive ions just by changing polarities of the high voltage applied to the corona discharge electrode. Therefore, these surfactants can be supplied any time independently of the polarity in the ionization mode. The non-ionic surfactants are stable and never cause ion-molecule reactions even when they collide with multiply-charged ions through the mesh electrode 23.

Figure 19:
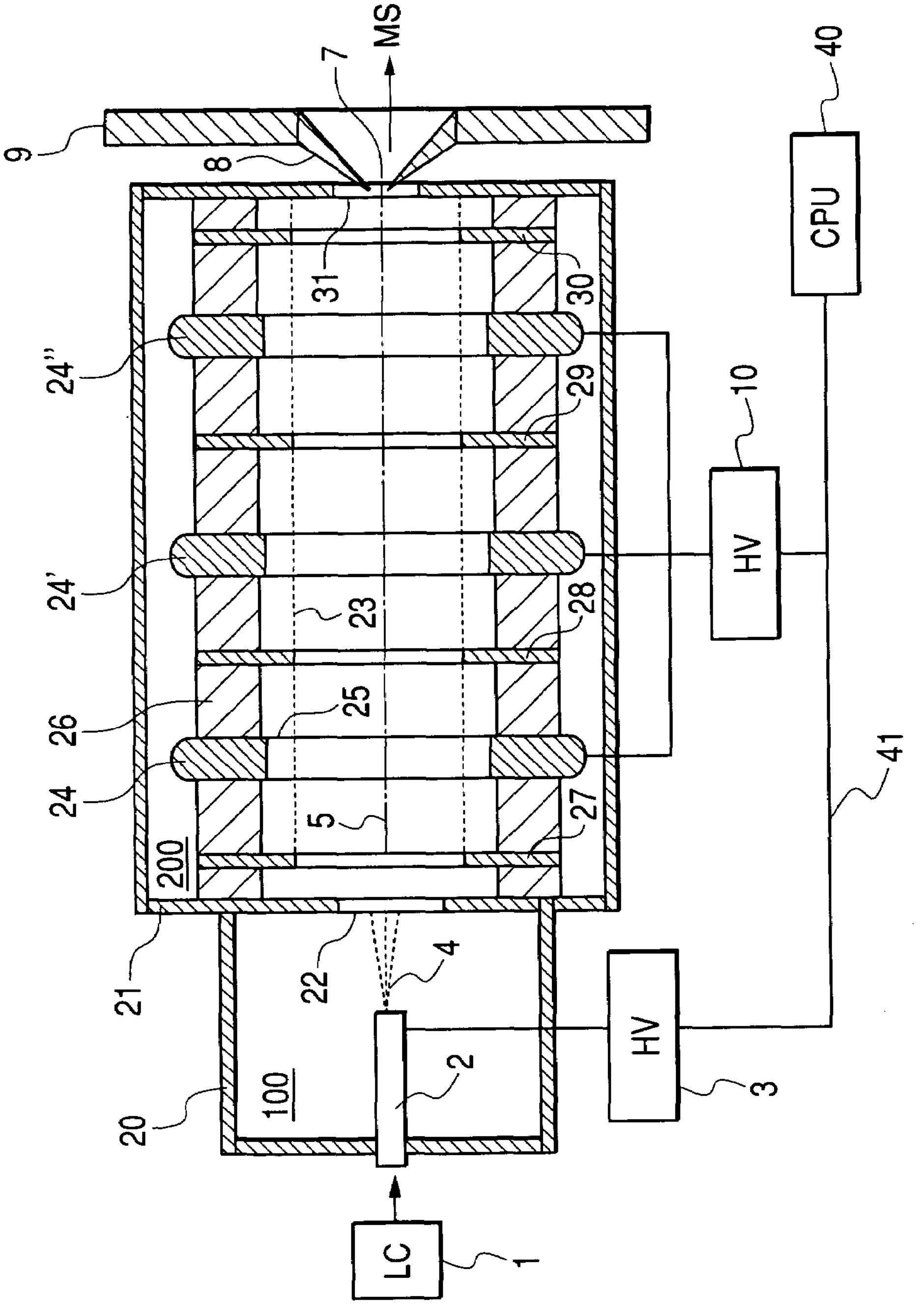
FIG. 19 shows a modification example of the fourth embodiment.

FIG. 19 shows a modification example of the fourth embodiment.

The thin metallic wire rings for corona discharge electrodes are very thin (0.3 to 0.1 mm in diameter) and must be handled very carefully when they are assembled or cleaned. To make their handling easier, the corona discharge electrodes of FIG. 19 use flat metallic rings instead of thin metallic wire rings. Substantially, the flat metallic rings 24 of about 15 mm in inner diameter, about 20 mm in outer diameter, and 0.5 mm thick are prepared by punching a stainless steel plate of about 0.5 mm thick. The outer edge of each flat metallic ring must be ground by a grinder to prevent undesired corona discharging. The inner edge 25 of each flat metallic ring 24 need not be ground and deburred. The flat metallic rings 24, 24', and 24" are respectively sandwiched by metallic shielding electrodes 27, 28, 29, and 30 and supported by insulating columns 26 with the mesh electrode 23 enclosed in the assembly of the flat metallic rings and the metallic shielding electrodes. The mesh electrode 23 and the shielding electrodes 27, 28, 29, and 30 are kept at a ground potential. The corona discharge power supply applies a high voltage of about 3 kV to the flat metallic rings 24, 24', and 24". As the result, a high electric field is produced at the inner edge of each flat metallic ring (24, 24', or 24") and corona discharges take place there. In accordance with this embodiment, the corona discharge electrodes using flat metallic rings have more discharging areas than the corona discharge electrodes using thin metallic wire rings and enable measurement in a higher dynamic range. Further, the corona discharge electrodes using flat metallic rings are tough and strong and facilitate assembling and cleaning thereof.

Figure 20:
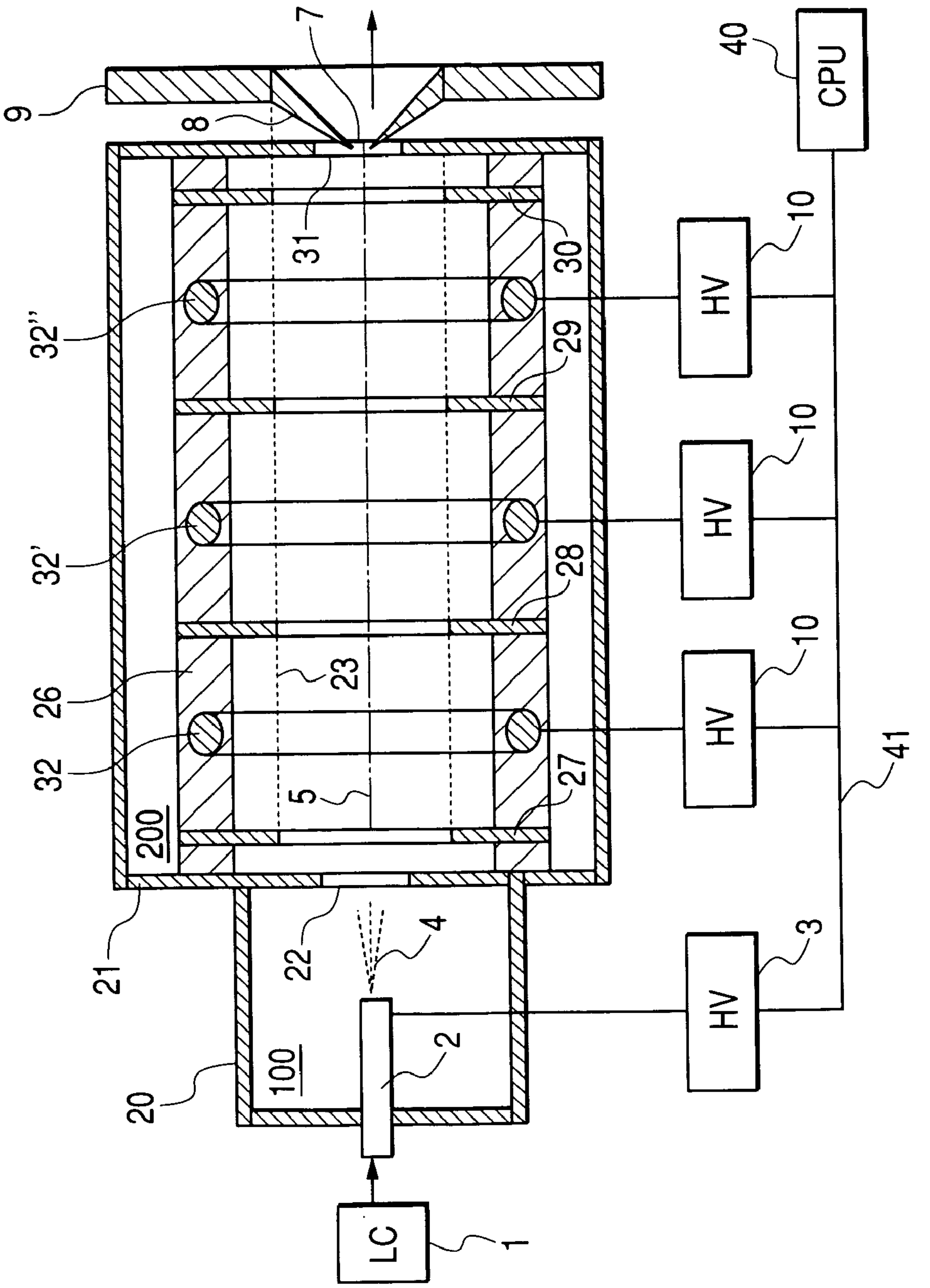
FIG. 20 shows a modification example of the fourth embodiment.

FIG. 20 shows another modification example of the fourth embodiment.

In this embodiment, each of the corona discharge electrodes 32, 32' and 32" is connected to its own corona discharge power supply (10, 10', or 10"). The data processing unit 40 sends a control signal to respective power supplies to independently control the applied high voltages or discharge currents of the corona discharge electrodes 32, 32' and 32".

In accordance with this embodiment, we can turn on, for example, only the corona discharge electrode 32 to make ion-ion reactions (without applying a high voltage to the corona discharge electrodes 32' and 32"). It is possible to turn on or off any corona discharge electrode and control the quantity of negative reactant ions to be applied in combination.

Further, it is possible to expand the dynamic range of the discharge current (id) greatly as the data processing unit 40 can individually control the power supplies 10, 10', and 10" which apply high voltages to the corona discharge electrodes. This expands the dynamic range of the quantity of currents off reactant ions and becomes very helpful in actual LC/MS measurement.

Figure 21:
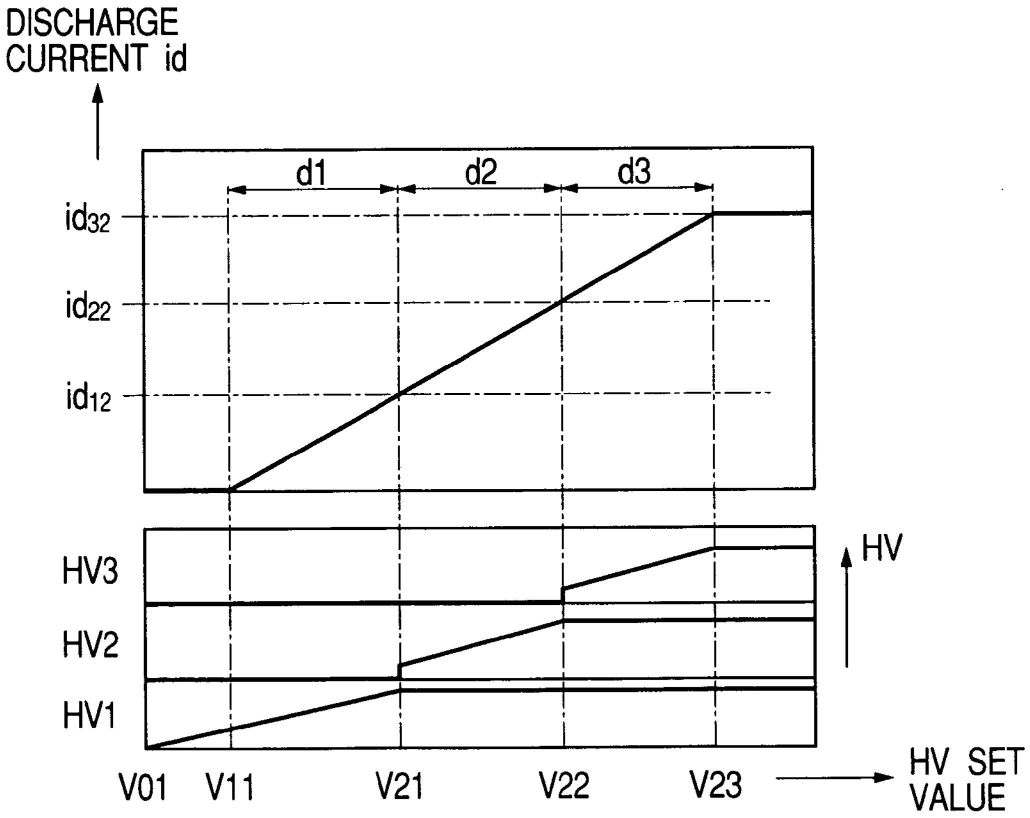
FIG. 21 illustrates a controlling method of the fourth embodiment.

FIG. 21 illustrates a controlling method of the fourth embodiment.

As this embodiment has three sets of a corona discharge electrode and a corona discharge power supply, it can be said that the embodiment has three APCI ion sources. Let's call these three APCI ion sources APCI1, APCI2, and APCI3 in sequence from the ESI ion source to the aperture 7. First we set corona discharging voltages (HV2 and HV3) for APCI2 and APCI3 to 0 to stop corona discharging of these two APCIs. Then we increase the corona discharging voltage (HV1) of APCI1 linearly. At V11, corona discharging becomes stable and the HV-id relationship becomes linear (in region d1). Further, we gradually increase the corona discharging voltage (HV1) of APCI1. At V21, we stop increasing HV1 and keep HV1 at a constant corona discharging voltage. This is because spark discharging may start when HV1 exceeds V21. Usually, V21 is 80% to 90% of the voltage at which spark discharging starts. When HV1 reaches V21, we apply a voltage equivalent to the voltage $Vc_{11}$ (see FIG. 15) at which corona discharging becomes stable to APCI2 and start to increase HV2. In the d2 region, the total discharge current (id) is the sum of charge currents of APCI1 and APCI2. At V22, we stop increasing HV2 and keep HV2 at a constant corona discharging voltage. This is to prevent spark discharging in APCI2. Then at V22, we apply a voltage at which APCI3 corona discharging becomes stable, that is, a voltage equivalent to a voltage $Vc_{11}$ to APCI3. We increase HV3 (for APCI3) up to V23 to saturate.

By independently controlling voltages for three corona discharge power supplies, the APCI ion sources can have a wide pseudo dynamic charge-current (id) range which is approximately linear from 0 to $id_{32}$.

Figure 23:
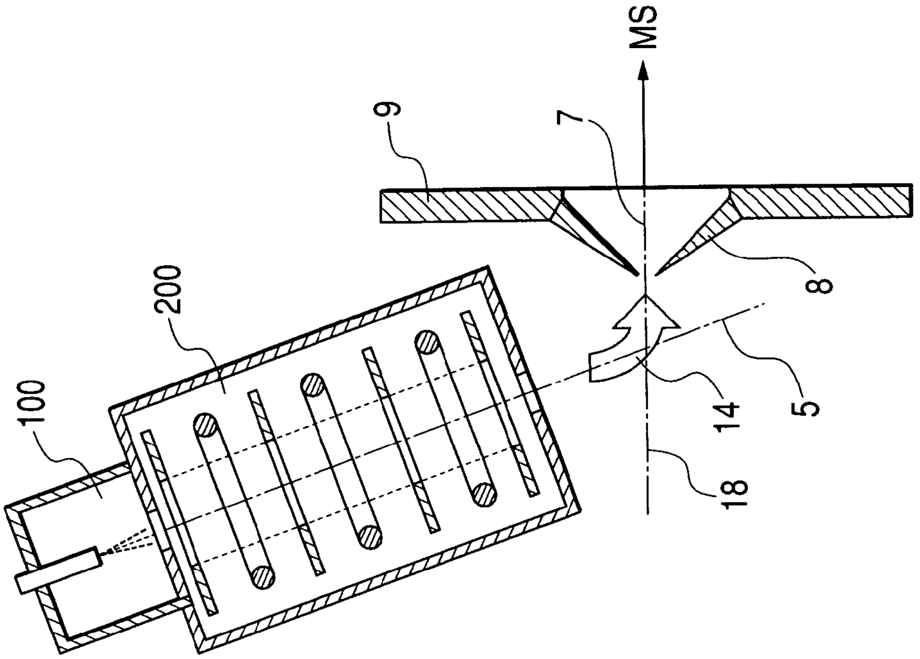
FIG. 23 shows a modification example of the fourth embodiment.
Figure 22:
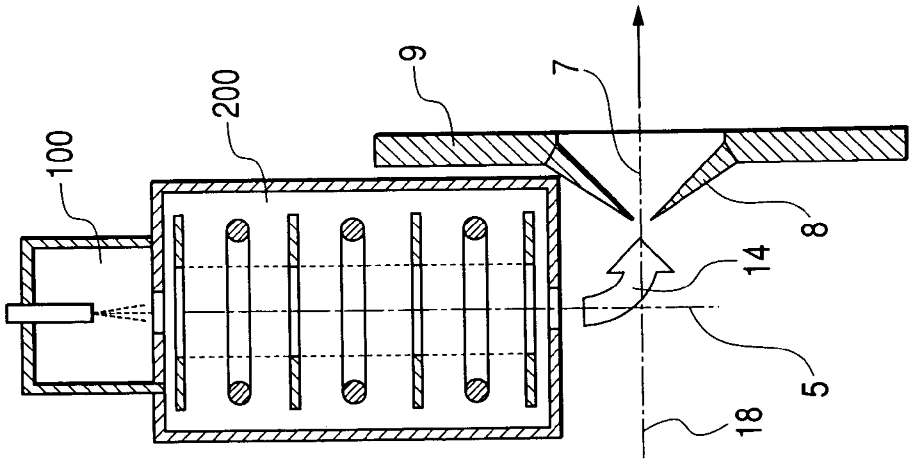
FIG. 22 shows a modification example of the fourth embodiment.

FIG. 22 and FIG. 23 show modification examples of the fourth embodiment. In these examples, the ESI ion beam axis 5 intersects with the axis of the aperture 7.

FIG. 22 shows a modification example in which the ESI ion beam axis 5 is approximately perpendicular to the axis of the aperture 7. FIG. 23 shows a modification example in which the ESI ion beam axis 5 intersects with the axis of the aperture 7 at about 120 degrees to the axis of the aperture 7.

The positive multiply-charged ions produced by the ESI ion source 100 are fed into the APCI ion source 200 which has a plurality of corona discharging parts. Negative ions are applied to the positive multiply-charged ions and ion-ion reactions take place. With this, the multiply-charged ions reduce their charges. Then, the ions going out of the APCI ion source 200 reaches the vicinity of the ion sampling aperture 7 of the mass spectrometer. The axis of the ESI ion flow is perpendicular to the axis 18 of the ion sampling aperture 7. The multiply-charged ions in the vicinity of the ion sampling aperture 7 are attracted into the mass spectrometer and mass-analyzed there. In the mesh electrode of the APCI ion source 200, the multiply-charged ions frequently collide with negative ions and neutral molecules. Therefore, the APCI ion source 200 emits charged droplets and fast neutral molecules in addition to ions. Intersection of the axis of the ESI ion flow with the axis of the aperture 7 can prevent neutral molecules from entering the mass spectrometer and allow selective introduction of charge-reduced ions into the mass spectrometer.

Embodiment 5

Below will be explained a mass-analyzing method using mass analysis apparatus of Embodiment 1 to Embodiment 5.

FIG. 24 illustrates an operation diagram of the mass analysis apparatus of this invention.

In period 1 (t0 to t1) where the ESI applied voltage (HV) is on, the ESI ionization starts and positive multiply-charged ions are produced. Contrarily, the discharge current of the APCI ion source is 0, that is, discharging is off. The mass spectrometer starts mass scanning and obtains a mass spectrum. As the result, in period 1, the mass spectrum of ESI ionization is obtained directly.

At t1 (in period 2), the corona discharge current value is set to id1 and corona discharging starts. The positive multiply-charged ions generated by the ESI causes ion-ion reactions with negative reactant ions generated by the APCI and reduce their charges. As the result, the mass spectrum contains less chemical noises and peaks of multiply-charged ions having less charges.

At t2 (in period 3), the corona discharging in the APCI stops and the mass spectrum of the ESI is directly obtained. At t3 (in period 4), the APCI turns on again and the mass spectrum of charge-reduced ions is obtained.

In this way, the APCI is turned on and off repeatedly to obtain mass spectra. The data processing unit 40 collects ESI mass spectra in the odd-numbered periods and charge-reduced mass spectra in the even-numbered periods. By comparing these mass spectra, we can easily mass-analyze the specimen. Further, we can extract and trace ion intensities of mass peaks individually in the odd- and even-numbered periods. In other words, we obtain two kinds of mass chromatograms and make deeper LC/MS mass analyses. The APCI discharge current (id) is preset by the data processing unit 40.

In the LC/MS mass analysis, it may sometimes happen that the required quantity of negative reactant ions is dependent upon the quantities of dissolved components or compound types. This problem can be solved by storing the relationships of charge current and retaining time in the data processing unit 40 and varying the charge current value as the components dissolve.

FIG. 24 illustrates a method of mass-scanning in synchronism with corona-discharge on/off operations of the APCI ion source for reactant ions to get mass spectra. For a time-of-flight (TOF) mass spectrometer, a mass spectrum can be obtained within 1 ms. In this case, another application is enabled as shown in FIG. 25.

The APCI is off in period 1 (t0 to t1) and starts discharging at the discharge current of id1 in period 2. We repeat mass scanning in every period, total the mass spectra, and get an average mass spectrum in each period.

Figure 26:
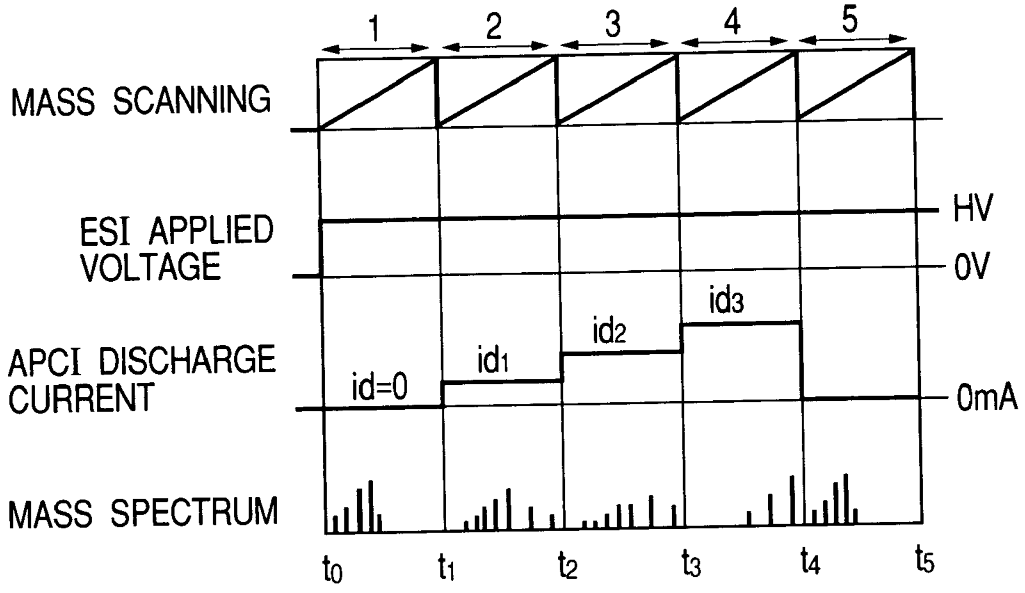
FIG. 26 illustrates a controlling method of this invention.

With this spectra averaging method, we can get stable mass spectra. The example of FIG. 26 is also applicable to QMS and ion trap mass spectrometers in addition to the TOF-MS.

Figure 25:
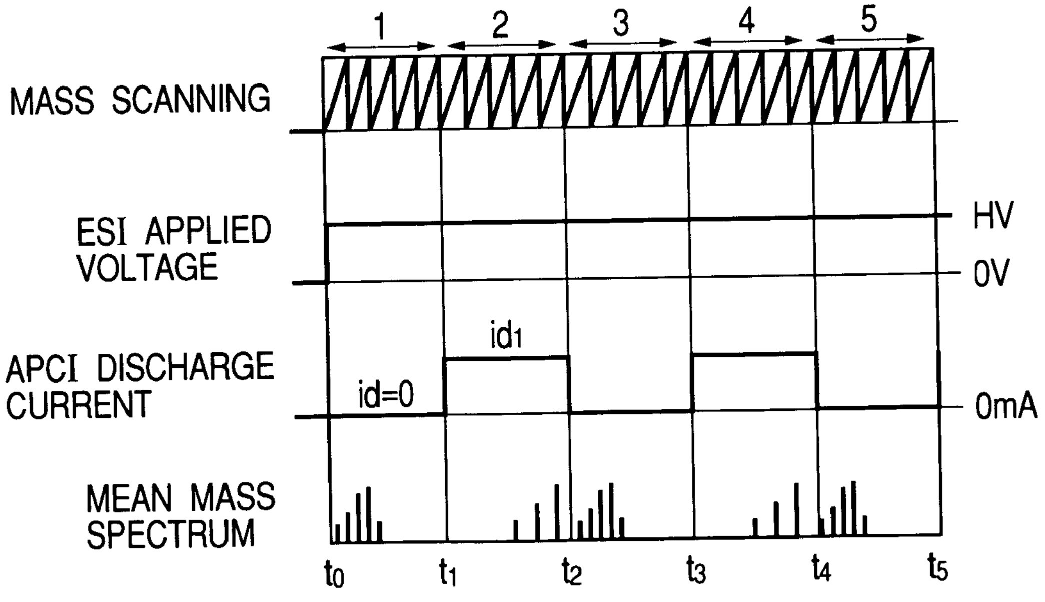
FIG. 25 illustrates a controlling method of this invention.

FIG. 24 and FIG. 25 mainly illustrate a method of repeatedly turning on and off corona discharging in the APCI ion source to get mass spectra. FIG. 26 illustrates a method of changing the APCI discharge current in a step-like manner as the time goes by and thus controlling the progress of the ion-ion reactions.

The APCI is off (id=0) in period 1 (t0 to t1), discharges at discharge current id1 in period 2 (t1 to t2), discharges at id2 in period 3 (t2 to t3), and discharges at id3 in period 4 (t3 to t4). Periods 1 to 4 are repeated cyclically. One or more mass spectra are obtained in each period and the data is collected by the data processing unit 40. This enables simultaneous acquisition of direct ESI mass spectra and mass spectra of different charge reduction progress rates even when the content of components from LC1 to the ESI ion source 100 varies continuously. The discharge current is controlled automatically in mass spectroscopy if it is stored beforehand in the data processing unit 40. Although this embodiment uses three discharge current levels, one or more discharge current levels can be used.

Figure 27:
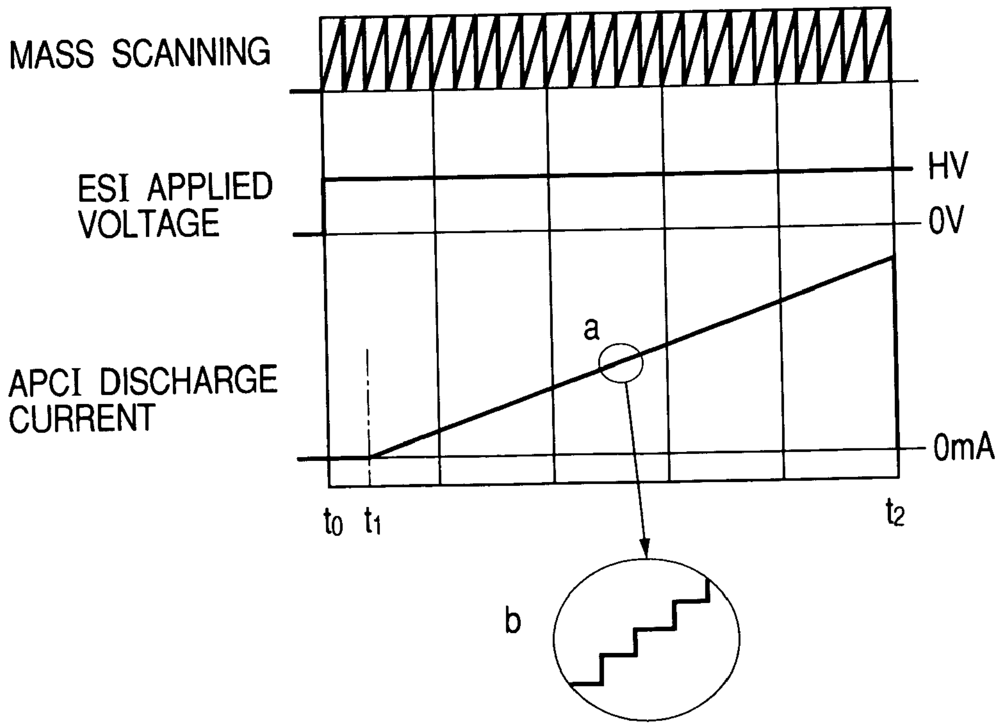
FIG. 27 illustrates a controlling method of this invention.

As shown in FIG. 27, it is also possible to set this discharge current in a fine step-like manner and measure mass spectra repeatedly. Further, it is possible to collect mass spectra quickly while sweeping the discharge current very slowly instead of changing the discharge current in a step-like manner. With this, we can easily monitor how the multiply-charged ions reduce their ions gradually by ion-ion reactions, as shown in FIG. 4.

Figure 28:
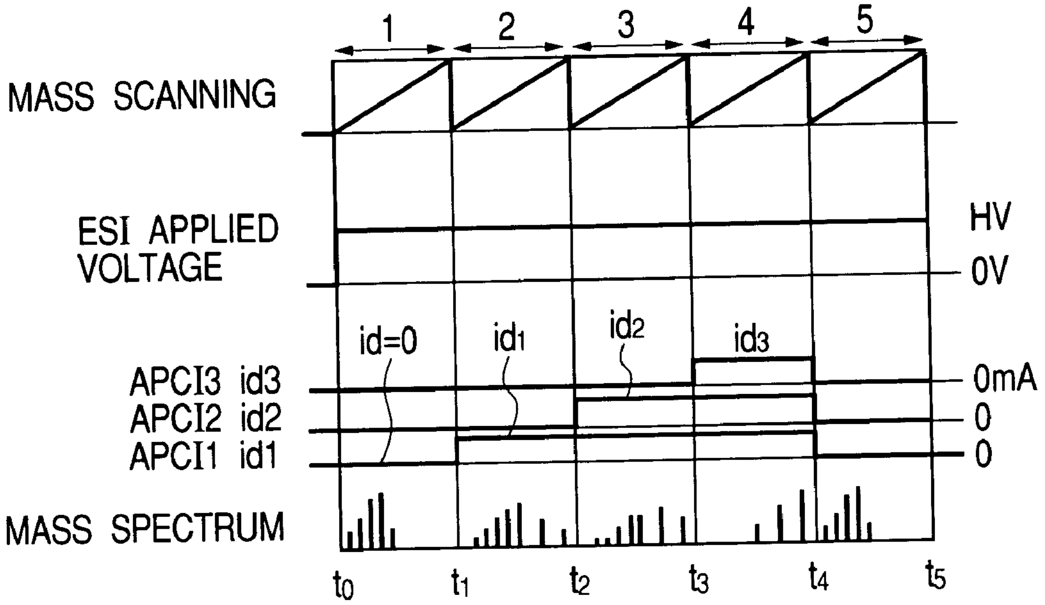
FIG. 28 illustrates a controlling method of this invention.

FIG. 28 illustrates a mass-analyzing method using a mass analysis apparatus of FIG. 20 disclosed by Embodiment 4. The mass analysis apparatus of FIG. 20 is equipped with a plurality of APCI ion sources each of which is connected to its own high voltage power supply (10, 10', or 10").

In period 1 (t0 to t1), all three APCI ion sources (APCI1, APCI2, and APCI3) are off to suppress corona discharging. In period 2 (t1 to t2), only APCI1 is turned on and starts corona discharging at discharge current id1. The other APCI ion sources (APCI2 and APCI3) remain off. In period 3 (t2 to t3), APCI1 keeps on corona discharging and APCI2 is turned on and starts corona discharging at discharge current id2. As the result, the total discharge current (id) in period 3 is the sum of id1 and id2. In period 4 (t3 to t4), APCI1 and APCI2 keep on corona discharging and APCI3 is turned on and starts corona discharging at discharge current id3. As the result, the total discharge current (id) in period 4 is the sum of id1, id2, and id3. With this, we can periodically collect a single ESI mass spectrum and mass spectra which are the result of three steps of ion-ion reactions. Although this method is similar to the embodiment of FIG. 26, the apparatus of this embodiment having some APCI ion sources can change positions of generating negative reactant ions emitted from the APCI ion sources. With this, we can verify a spatial expansion of ion-ion reactions.

Figure 29:
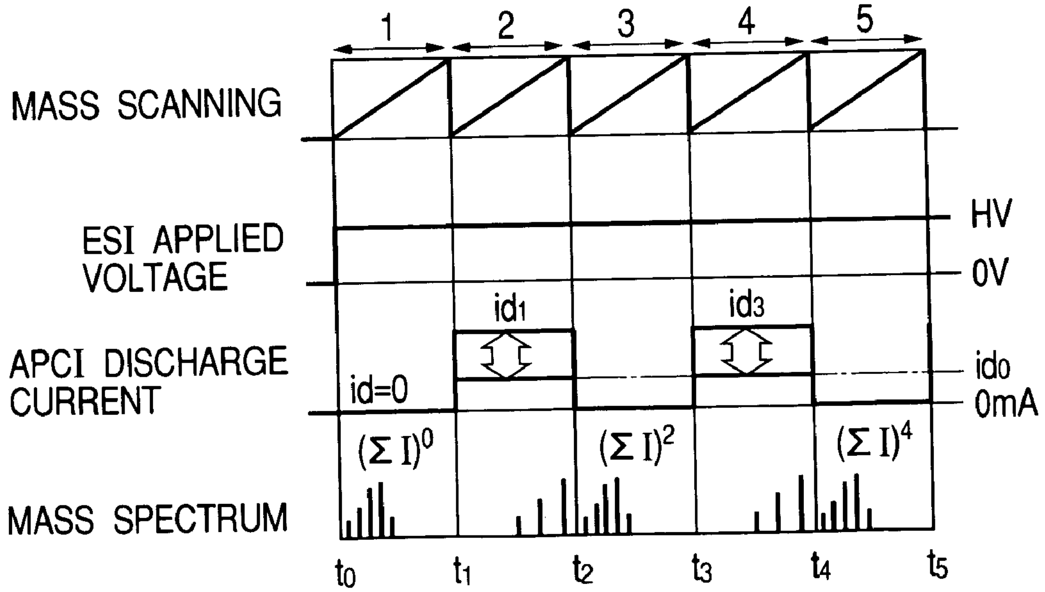
FIG. 29 illustrates a controlling method of this invention.

FIG. 29 illustrates another example of mass-analyzing method using the mass analysis apparatus of FIG. 20 disclosed by Embodiment 4.

The mass-analyzing method of FIG. 22 using the mass analysis apparatus of FIG. 20 could greatly expand the dynamic range of the discharge current. However, for mass analysis of components fed from a liquid chromatograph (LC) by an ESI-ion-ion reaction mass spectrometer, it is difficult to perform perfect ideal ion-ion reactions on all of components fed from the LC (from a trace component to a major component). This is because the discharge currents or high voltages of the APCIs for producing reactant ions are almost fixed during measurement.

In period 1 (t0 to t1), we turned off corona discharging of all APCIs and get an ESI mass spectrum. From this mass spectrum, we total the quantities of ions in a specified mass region. (The total is expressed by SI.) From this SI value, we determine a discharge current value (Idn) in the next period.

$$idn = k(SI)n-1 + id0 \qquad (12)$$

wherein "k" is a proportionality constant which is specific to a measuring apparatus or specimen. The value "k" is preferably set in the data processing unit in advance. Id0 is a basic discharge current level, which is specific to a measuring apparatus or specimen.

More specifically, in period (n−1), we turn off corona discharging of the APCI for reactant ions and get the ESI mass spectrum in this status. From this ESI mass spectrum, we total the quantities of ions (SI)n−1 in the m/z range of 500 to 3000. We determine the APCI discharge current (idn) of the next period n. The data processing unit 40 calculates a signal to control the corona discharge power supply 10 from this APCI discharge current (idn) and controls the corona discharge power supply 10.

With this method, the APCI discharge current (Id) can be controlled automatically according to the total quantity of ions (SI) in the mass spectrum, that is, the quantity of components fed into the ESI ion source. This method is extremely effective to APCI ion sources having a wide dynamic range in the apparatus such as that of FIG. 20, but also applicable to APCI ion sources having narrower dynamic ranges.

Although this invention is described above in detail by way of embodiments, the ion source for ionizing specimens in accordance with this invention is applicable not only to the ESI ion source but also to atmospheric pressure ion sources such as pneumatically-assisted electro spray ion source, nano-spray ion source, sonic-spray ion source (SSI), and MALDI ion source that produce multiply-charged ions. Further this invention is applicable not only to a time-of-flight mass spectrometer (TOFMS) but also to mass spectrometers such as ion trap mass spectrometer, quadrupole mass spectrometer (QMS), ion cyclotron resonance mass spectrometer (ICRMS), and sector mass spectrometer.

This invention of a simple structure can simplify mass peaks coming from multiply-charged ions of biomolecules and facilitate mass spectrum analysis thereof.

Further, this invention can increase the quantity of reactant ions and expand the ion-ion reaction space. Furthermore, this invention can make ion-ion reactions stable also on components whose content from LC varies continuously. Therefore, this invention can increase information of specimen components and facilitate mass analysis.

What is claimed is:

1. A mass analysis apparatus comprising:

a first ion source which ionizes a sample and produces sample ions;

a second ion source which produces ions having a polarity opposite to the polarity of the sample ions, the second ion source being an atmospheric pressure chemical ionization ion source which comprises:

a corona discharge electrode;

a shield electrode which is formed to cover said corona discharge electrode and has an opening to emit the generated ions, wherein said shielded electrode is made of a conductive metal material and said opening is covered with a metal mesh; and a power source to supply a voltage to said corona discharge electrode; and a mass spectrometer, wherein said second ion source is provided between said first ion source and said mass spectrometer apart from the axis of a flow of the sample ions to the flow of sample ions discharged from said first ion source, wherein said first and second ion sources are atmospheric pressure ion sources that perform ionization at the atmospheric pressure and ions emitted from said first and second ion sources cross also at the atmospheric pressure.

2. The mass analysis apparatus of claim 1, wherein said first ion source is selected from the group of electro spray (ESI), pneumatically assisted electro spray, nano-spray, sonic spray (SSI), and MALDI ion sources.

3. The mass analysis apparatus of claim 1, wherein said shield electrode is kept at the ground potential.

4. The mass analysis apparatus of claim 1, wherein said second ion source is equipped with an inlet section which introduces a compound for accelerating generation of ions.

5. The mass analysis apparatus of claim 4, wherein said compound is selected from a group of alcohols and non-ionic surfactant.

6. A mass analysis apparatus comprising:

a first ion source which ionizes a sample to produce sample ions;

a second ion source which produces ions having a polarity opposite to that of the sample ions, the second ion source comprising:

a corona discharge electrode; and a shield electrode which is formed of a conductive metal material to surround said corona discharge electrode and a metal mesh covering an opening for emitting the produced ions; and a mass spectrometer, wherein said second ion source emits ions toward the flow of sample ions discharged from the first ion source to cross over the ion beams from both ion sources.

7. The mass analysis apparatus according to claim 6, wherein the first ion source is selected from a group of electro spray (ESI), pneumatically assisted electro spray, nano-spray, sonic spray (SSI), and MALDI ion sources.

8. The mass analysis apparatus of claim 6, wherein said shield electrode is kept at the ground potential.

9. The mass analysis apparatus of claim 6, wherein the opening of the second ion source is positioned on an extended axis of the corona discharge electrode.

10. The mass analysis apparatus of claim 6, wherein the ion beam emitted from the opening of the second ion source intersects the sample ion beam emitted from the first ion source.

11. The mass analysis apparatus of claim 6, wherein the second ion source is equipped with an inlet section which introduces a compound for accelerating generation of ions.

12. The mass analysis apparatus of claim 11, wherein said compound is selected from a group of alcohols and non-ionic surfactants.

* * * * *